United States Patent
Uemura et al.

(10) Patent No.: US 6,609,085 B1
(45) Date of Patent: Aug. 19, 2003

(54) METHOD FOR STORING TIME SERIES DATA AND TIME SERIES DATABASE SYSTEM, METHOD AND SYSTEM FOR PROCESSING TIME SERIES DATA, TIME SERIES DATA DISPLAY SYSTEM, AND RECORDING MEDIUM

(75) Inventors: Ken Uemura, Yokohama (JP); Tsunehiro Saito, Yokohama (JP); Satoshi Yoshida, Yokohama (JP); Shinji Yamamura, Takasago (JP); Hiroshi Takamuku, Funabashi (JP); Koji Abematsu, Takasago (JP)

(73) Assignee: Asahi Glass Company, Ltd., Tokyo (JP)

( * ) Notice: Subject to any disclaimer, the term of this patent is extended or adjusted under 35 U.S.C. 154(b) by 0 days.

(21) Appl. No.: 09/381,276

(22) PCT Filed: Jan. 18, 1999

(86) PCT No.: PCT/JP99/00129

§ 371 (c)(1),
(2), (4) Date: Sep. 20, 1999

(87) PCT Pub. No.: WO99/36861

PCT Pub. Date: Jul. 22, 1999

(30) Foreign Application Priority Data

| Jan. 19, 1998 | (JP) | 10-007913 |
| May 28, 1998 | (JP) | 10-147686 |
| Jan. 8, 1999 | (JP) | 11-003074 |

(51) Int. Cl.[7] .................................................. G09G 5/12
(52) U.S. Cl. ........................ 702/189; 702/69; 702/79; 702/113; 702/124; 702/177; 702/189
(58) Field of Search .................... 702/66, 67, 69, 702/79, 113–115, 124–126, 177–180, 183, 187, 188, 189, FOR 103–104, FOR 134–135, FOR 139, FOR 170–171; 700/90–93; 345/440; 707/100, 104.1; 382/228, 209, 210, 224, 225; 708/200, 520

(56) References Cited

U.S. PATENT DOCUMENTS

| 5,109,475 | A | * | 4/1992 | Kosaka et al. ................ 706/19 |
| 5,301,120 | A | | 4/1994 | Magario |
| 5,412,769 | A | * | 5/1995 | Maruoka et al. ............ 345/440 |
| 5,519,861 | A | * | 5/1996 | Ryu et al. ..................... 707/1 |
| 5,625,572 | A | | 4/1997 | Yonekura et al. |
| 5,884,320 | A | * | 3/1999 | Agrawal et al. ............ 707/100 |
| 5,905,814 | A | * | 5/1999 | Mochizuki et al. ......... 382/238 |
| 5,943,662 | A | * | 8/1999 | Baba et al. .................. 706/12 |
| 6,020,898 | A | * | 2/2000 | Saito et al. ................. 345/440 |
| 6,195,341 | B1 | * | 2/2001 | Sakoda et al. .............. 370/330 |
| 6,212,508 | B1 | * | 4/2001 | Sterzing et al. ............... 706/15 |
| 6,230,064 | B1 | * | 5/2001 | Nakase et al. .............. 345/764 |
| 2001/0011208 | A1 | * | 8/2001 | Takeuchi et al. ............. 703/2 |
| 2002/0023116 | A1 | * | 2/2002 | Kikuchi et al. ............ 708/402 |
| 2002/0032696 | A1 | * | 3/2002 | Takiguchi et al. ........ 707/500.1 |

FOREIGN PATENT DOCUMENTS

| DE | 42 03 432 | 4/1993 |
| DE | 43 25 860 | 2/1994 |
| DE | 196 21 788 | 3/1997 |
| EP | 0 727 750 | 8/1996 |
| JP | 2-20319 A | 1/1990 |

(List continued on next page.)

*Primary Examiner*—Marc S. Hoff
*Assistant Examiner*—Carol S. Tsai
(74) *Attorney, Agent, or Firm*—Oblon, Spivak, McClelland, Maier & Neustadt, P.C.

(57) ABSTRACT

A method for storing time series data comprising storing short period data at an arbitrary sampling period and storing long period data at a sampling period longer than the arbitrary sampling period, in which the time series data are stored in a hierarchically correlated manner. Even when a great amount of data are stored, processes such as reading out, transferring, and displaying requisite data can be efficiently executed at high speed.

15 Claims, 33 Drawing Sheets

FOREIGN PATENT DOCUMENTS

| | | |
|---|---|---|
| JP | 04-064014 | 2/1992 |
| JP | 5-323919 A | 12/1993 |
| JP | 06-076079 | 3/1994 |
| JP | 6-213685 A | 8/1994 |
| JP | 6-282475 A | 10/1994 |
| JP | 7-210243 A | 8/1995 |
| JP | 7-311772 A | 11/1995 |
| JP | 9-204220 A | 8/1997 |
| JP | 10-240716 A | 9/1998 |

* cited by examiner

HOURLY SCALE

WEEKLY SCALE

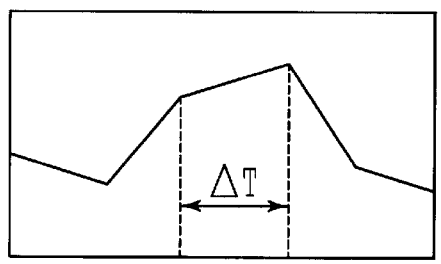
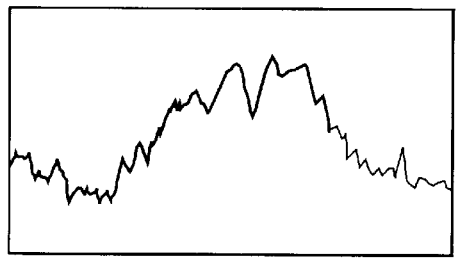
*FIG. 8A*  *FIG. 8B*
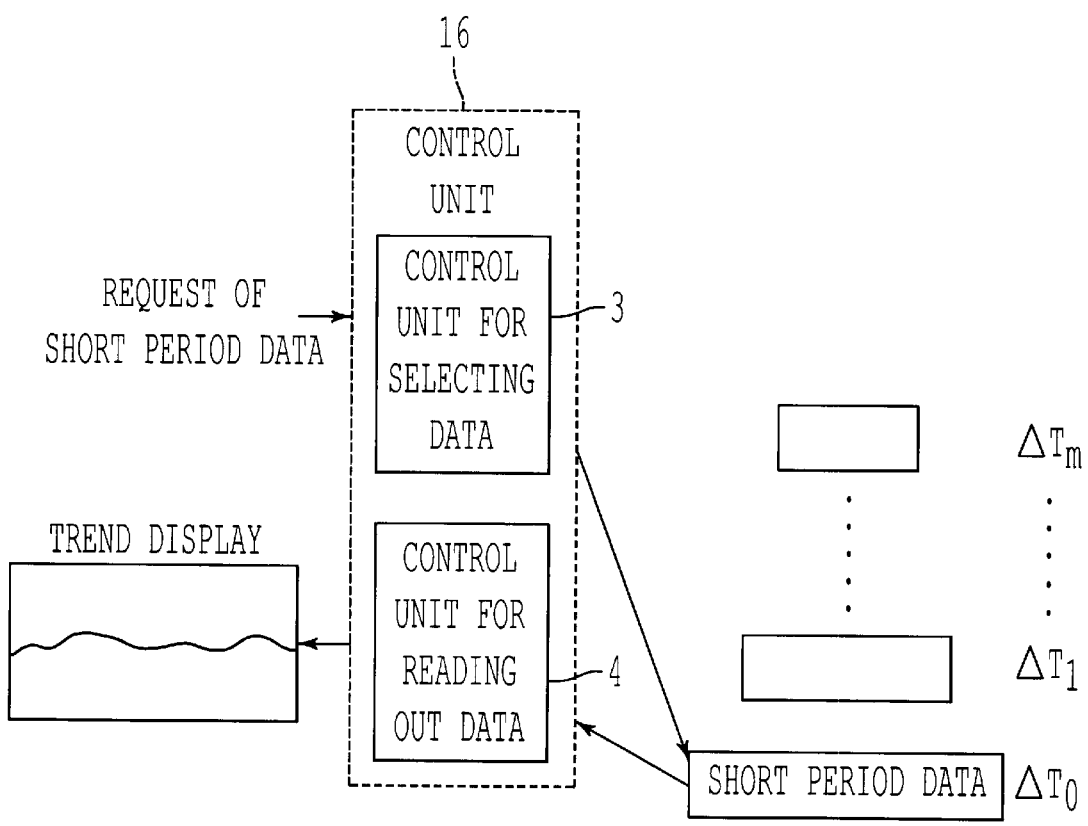
*FIG. 9*

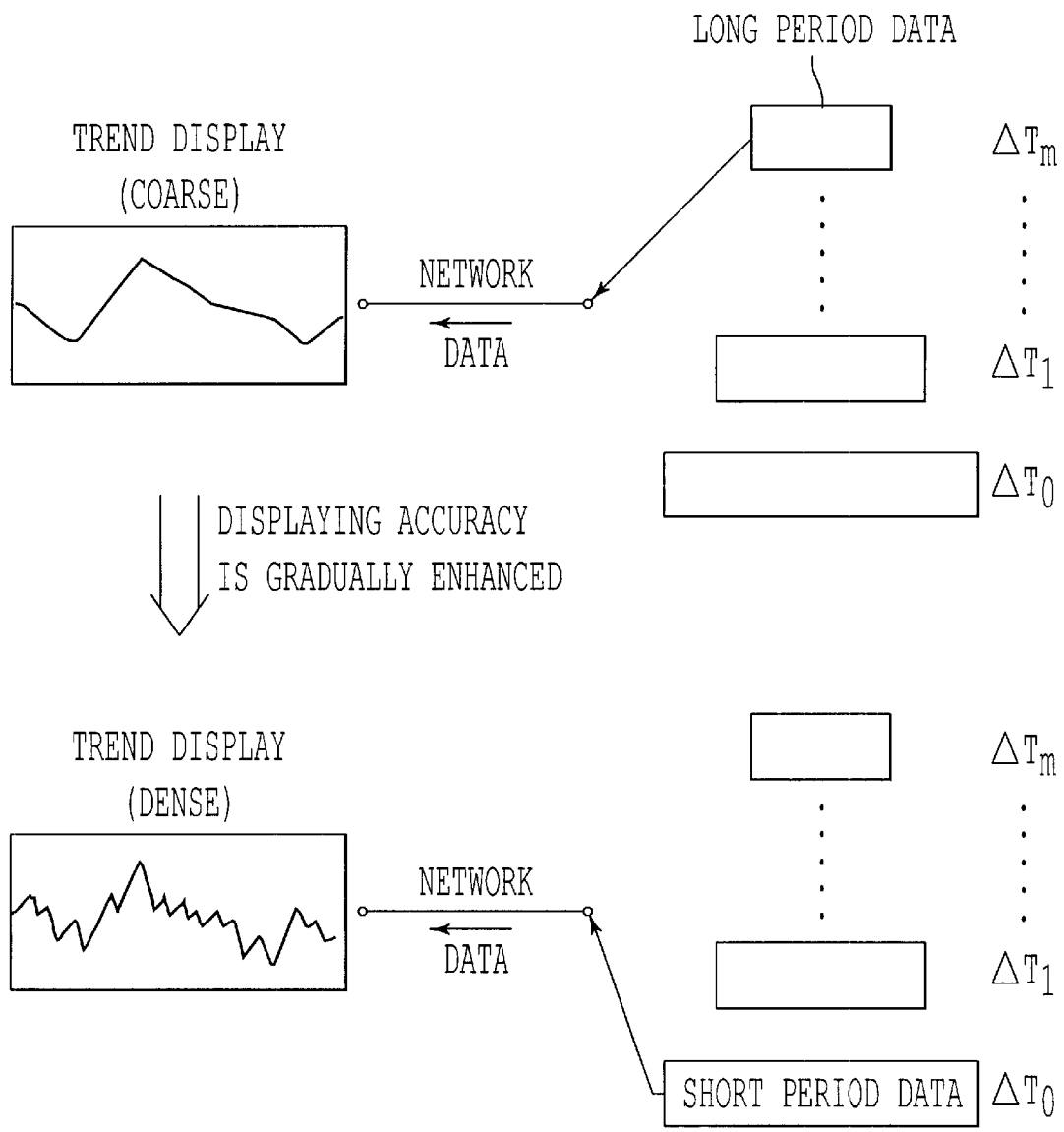

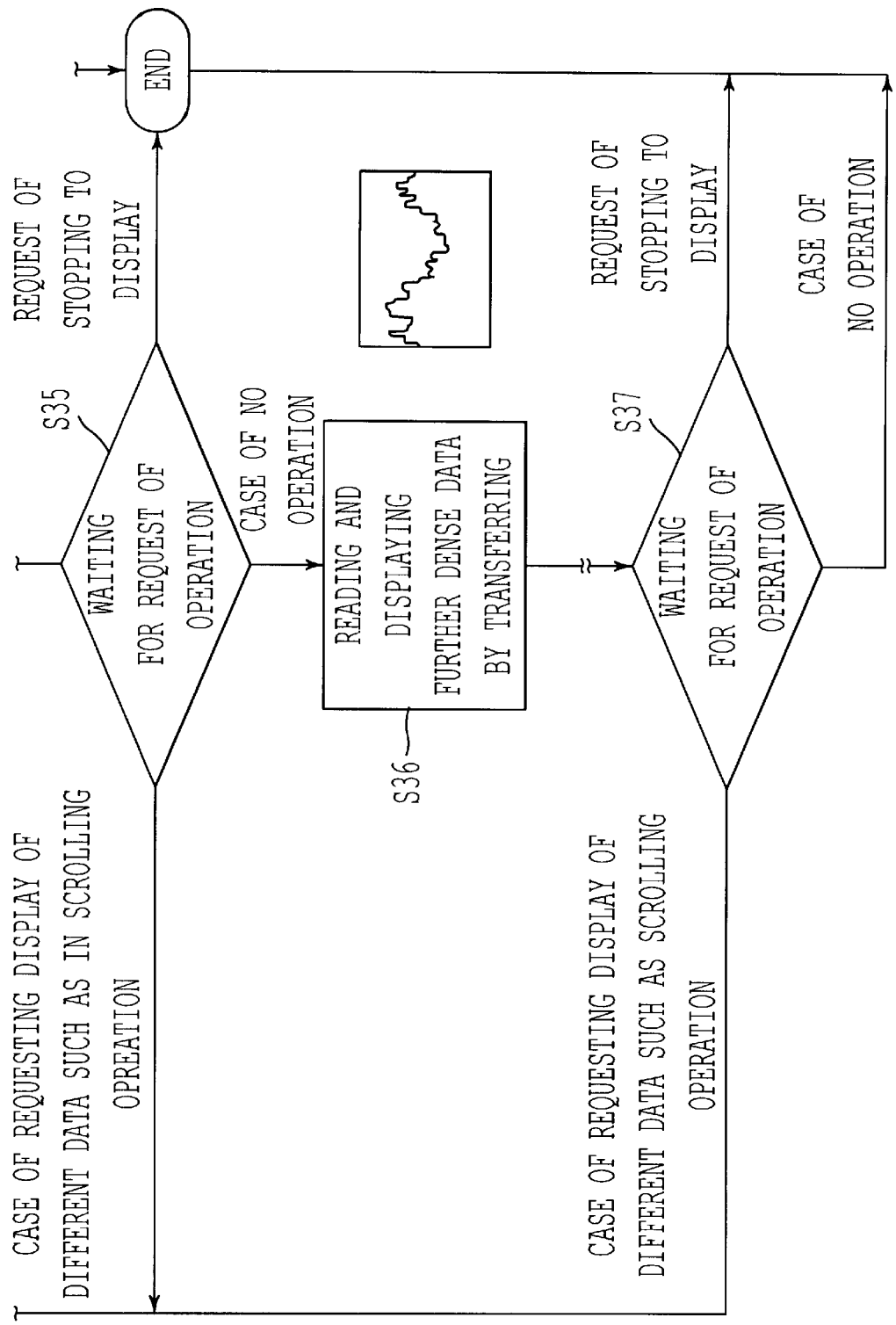

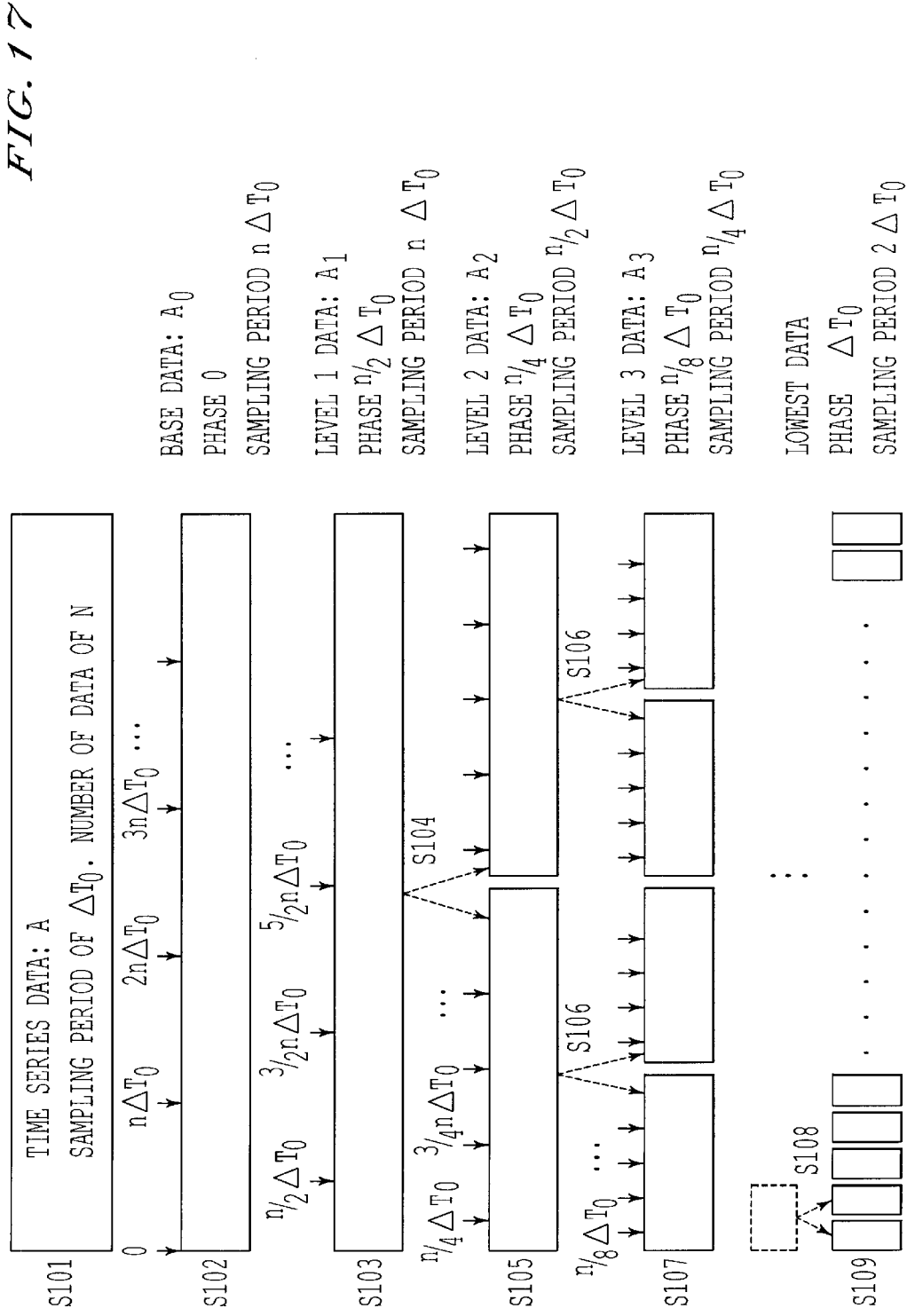

BEFORE SCROLLING

DISPLAYING
COARSE DATA

DETAILED
DISPLAY
AFTER SCROLLING

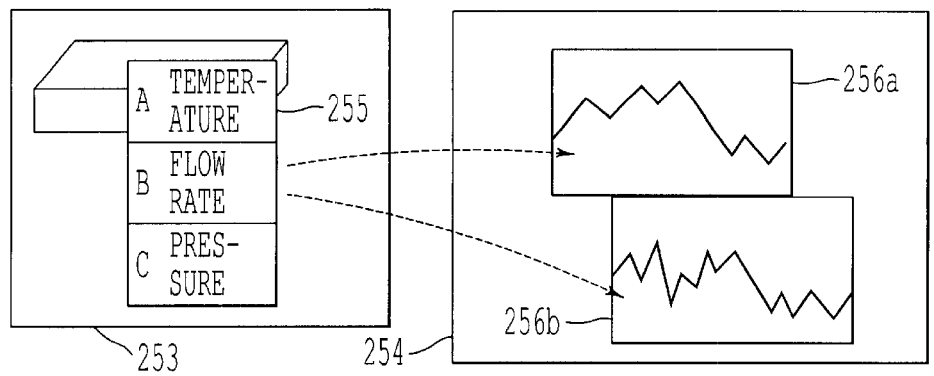
FIG. 34
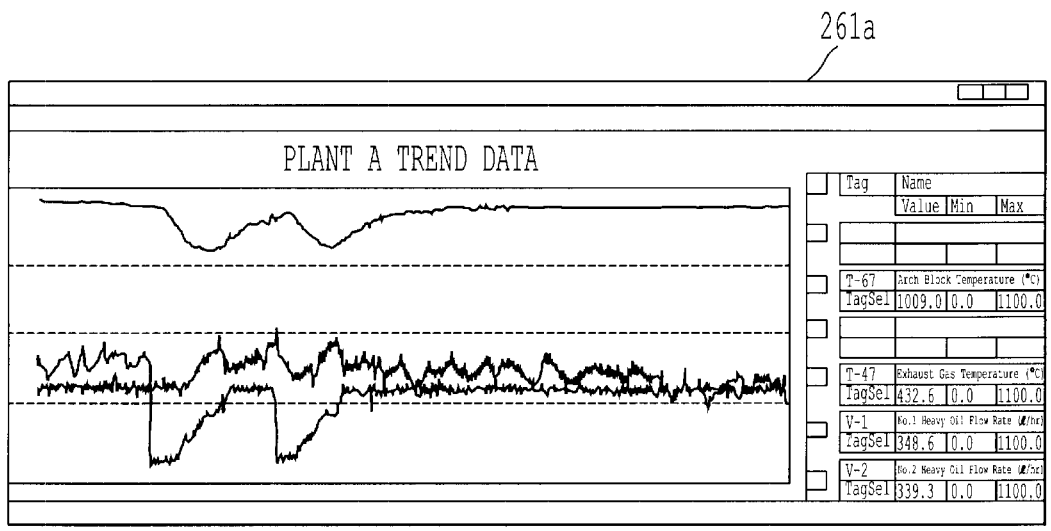
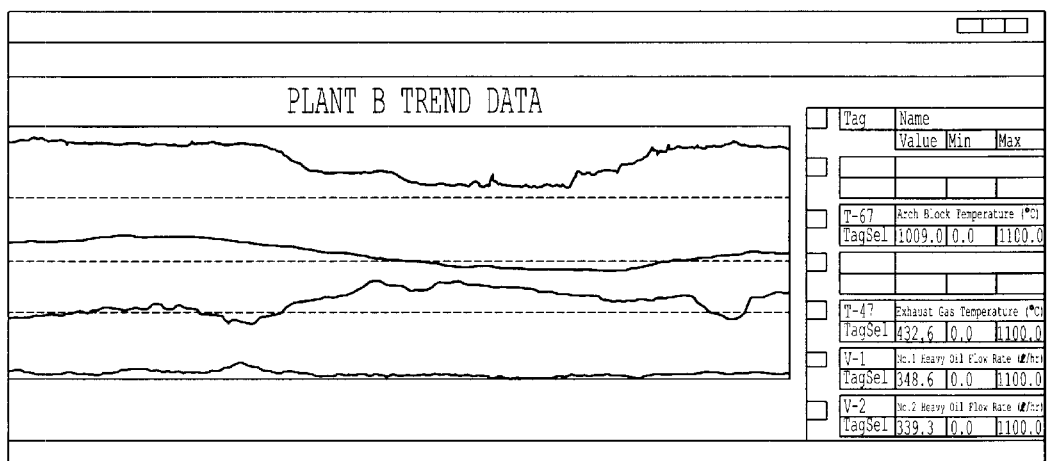
FIG. 35

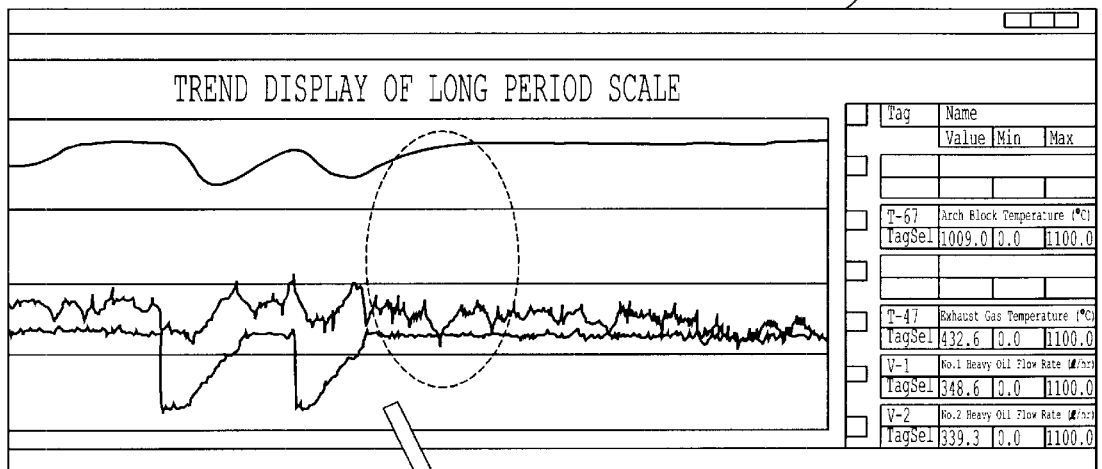
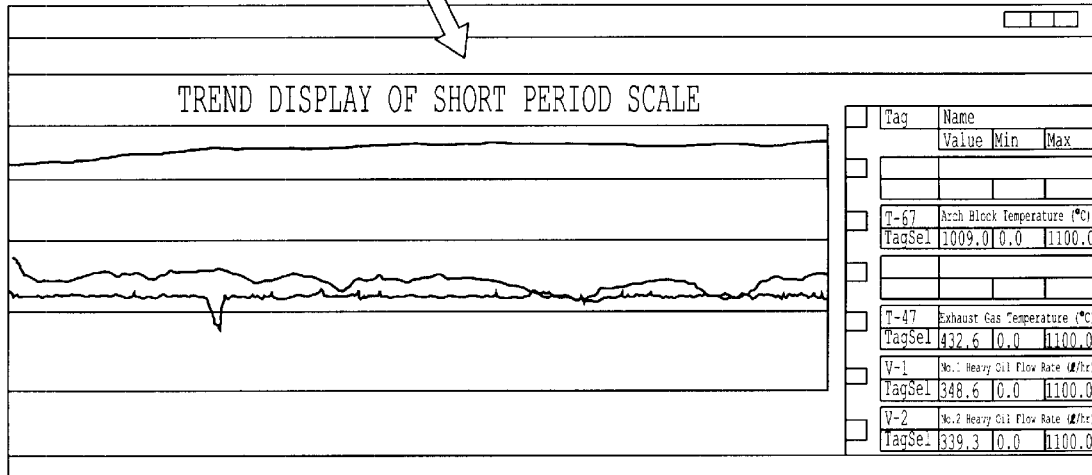
FIG. 36

FIG. 37A
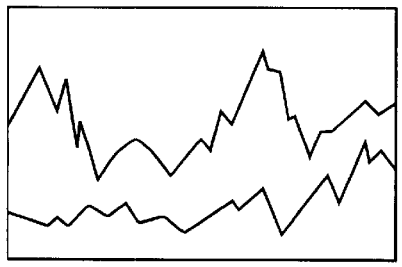
| STARTING DATE OF TAKING IN | 1998 2/8 18:55 |
| FINISHING DATE OF TAKING IN | 1998 2/9 18:55 |
| SETTING THINNING OUT INTERVAL | 3 pcs. |
OR
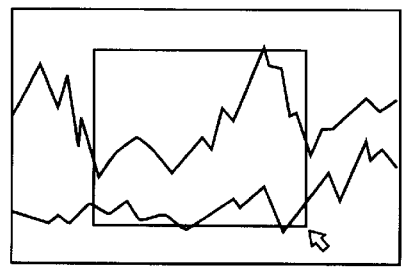
FIG. 37B
```
InitialDate   :1998 2/8 18:55
Date Number   :307
Delta Time    :360[SEC]
TAG-1,TAG-2
Item 1, Item 2
58.4,21.8,
55.8,20.0,
58.5,21.8,
6.9,22.5
56.8,21.8,
58.6,21.8,
66.9.21.8,
57.0,21.8,
56.9,20.6,
```
FIG. 37C

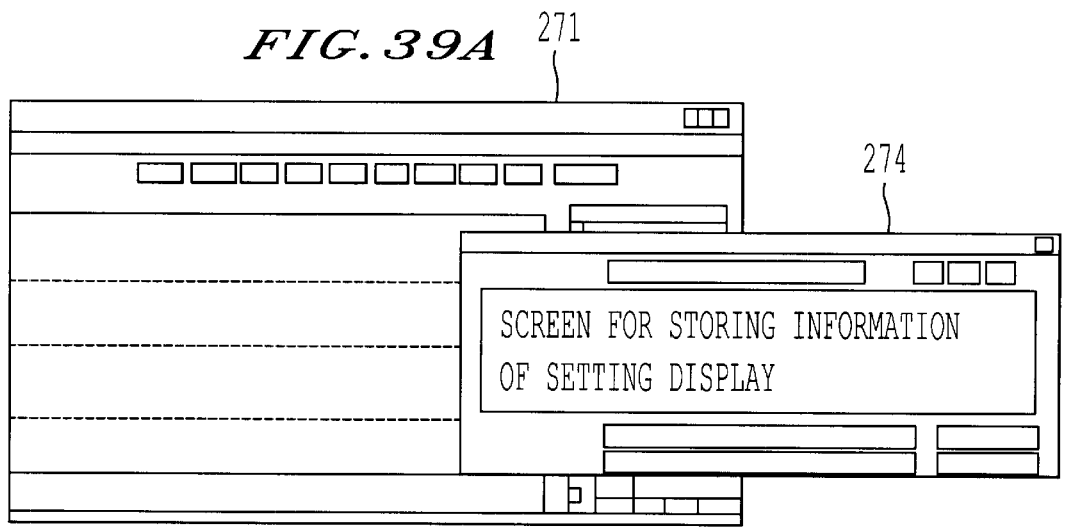
FIG. 39A
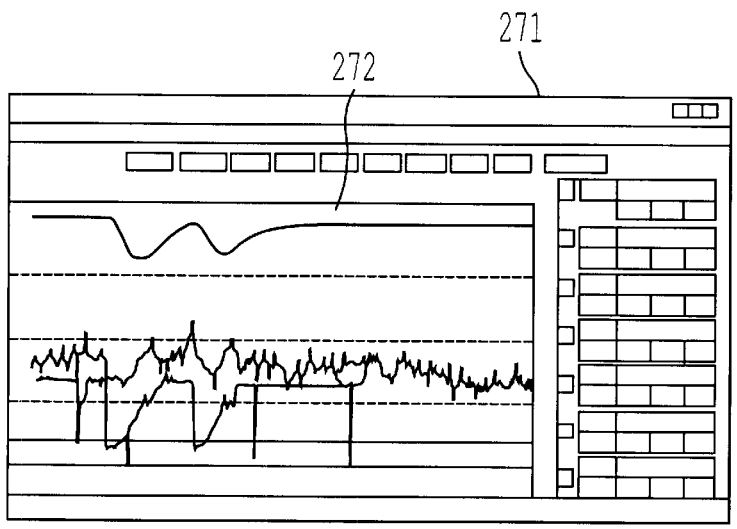
FIG. 39B

METHOD FOR STORING TIME SERIES DATA AND TIME SERIES DATABASE SYSTEM, METHOD AND SYSTEM FOR PROCESSING TIME SERIES DATA, TIME SERIES DATA DISPLAY SYSTEM, AND RECORDING MEDIUM

BACKGROUND OF THE INVENTION

1. Technical Field

The present invention relates to processing of time series data, represented by trend data and so on, in an industrial plant which is continuously operated, more specifically to storage of data into a recording medium, expansion of data to a memory, data transfer through a network, a method for storing time series data in reading out and displaying data, time series data base system, a method for processing time series data, a system of processing time series data, a system of displaying time series data, a medium recording the time series data or a program for processing the time series data.

2. Background Art

Conventionally, in an industrial plant, data exhibiting operating conditions of the plant are acquired by each predetermined time, a large amount of series data are then accumulated in a data base, and a trend (tendency, transition) of the time series data is displayed and analyzed. A system of displaying the trend having a function of on-line displaying such a trend of the time series data, hereinbelow, referred to as trend data, is proposed in various manners and utilized in various situations.

In the conventional system, when the time series data are stored, as illustrated in FIG. 40, time series data a1, a2, a3, . . . , an at each sampling period $\Delta T0$ are directly stored in serial according to a time schedule, or the time series data are subdivided into files having a predetermined size and then stored. According to such methods of storing data, there was a problem that a process of picking requisite data out and displaying trend data becomes very complicated when a large amount of data were stored for a long time.

For example, provided that items of data and the amount of data became large, it became difficult to select and pick out data to be displayed belonging to a target item and a target period among the large amount of data. Further, when it was tried to display trend data in a long term scale such as an order of year, it took a long time for displaying data or was impossible to display the data because the amount of data to be read out was excessively large.

As described, in accordance with the conventional methods of storing time series data illustrated in FIGS. 40 and 41, because the time series data at sampling periods $\Delta T0$ were sequentially read out in response to various requirements of reading out data for displaying various trend data, there was a problem that a long time was necessary to read out and display the data. For example, in case that data stored for an extremely long period were required to be read out at a sampling period $\Delta TL$ longer than $\Delta T0$, it was necessary to read all data belonging to the required period by the shortest sampling period $\Delta T0$ and pick out the data by making the sampling period $\Delta TL$. Therefore, there were problems such that troubles were occurred in reading out useless data and picking out the data; a process for displaying was extremely inefficient; and a requirement of processing at a high speed was not satisfied.

It is desired to minimize the amount of data to be treated, efficiently process, and conduct processes of accessing time series data at a high speed in case that the time series data are stored in a recording medium, the time series data are read out and expanded into a memory, and the time series data are transferred through a network.

Further, in case of a monitoring system which monitors by displaying various trend data of a plant, when, for example, the number of plants was increased or the plants existed in wide areas so as to extend a requirement of reading out the data to a plurality of plants, there were problems that data were acquired from the respective plants, a structure of system was complicated, and a process was complicated.

In order to read such trend data of the plurality of plants out and monitor at a single location, there is a case that a structure of data base system, which concentrates data of a plurality of groups corresponding to the all plants on a single host device and accumulates and stores these, is used. In such a system, there were problems such that a high cost device with a high performance was necessary to deal with a load concentrated on the single host device and data of all of the plants were unable to read out when a trouble occurred in the host device. Even in case that the data could be read out, in the conventional system, processes of instantaneously reading requisite data from the data of the plurality of groups from the different plants and immediately displaying a trend of data belonging to a date and a time desired by a user in a desired scale were complicated and occasionally impossible.

The present invention is provided in consideration of the above-mentioned circumstances. A first object is to provide a method for storing time series data, a time series data base system, a system for displaying time series data, and a recording medium in which time series data are recorded, which enable to efficiently execute a process of reading out requisite data at a high speed when a large amount of data are stored.

A second object of the present invention is to provide a method for processing time series data, a system of processing time series data, and a recording medium in which the time series data or a program for processing the time series data is recorded, which enable to efficiently execute processes concerning storage, read-out, transfer and so on of data without increasing the amount of data to be treated when a large amount of series data are processed.

A third object of the present invention is to provide a time series data base system and a method for processing time series data, which enable to efficiently and freely read out requisite time series data among a large amount of time series data included in a plurality of groups.

A fourth object of the present invention is to provide a system for displaying time series data and a method for processing time series data, which enable to easily display a trend of a plurality of time series data in a form desired by a user at a high speed.

DISCLOSURE OF THE INVENTION

A method for storing time series data according to the present invention is characterized by comprising a step of storing short period data in which time series data are stored at an arbitrary sampling period $\Delta T0$ concerning an arbitrary object, and a step of storing long period data which stores time series data at a sampling period $\Delta Ti$ (i is an integer of 1 or more) longer than the sampling period $\Delta T0$ concerning the above object, wherein the step of storing long period data is repeated by at least one time or more times; and the time series data at a plurality of sampling periods are stored in a recording medium in a state that the time series data are hierarchically related.

Preferably, in the above step of storing long period data, a representative value in a period of the above sampling period $\Delta Ti$ included in the time series data at the above sampling period $\Delta T0$ is stored as the above time series data at the sampling period $\Delta Ti$.

In the system utilizing the above method for storing the time series data, because time series data in an arbitrary sampling period and an arbitrary time can be easily selected and read out from the time series data at the plurality of sampling periods stored in the recording medium, requisite data can be efficiently executed at a high speed.

A first time series data base system according to the present invention is characterized by comprising a data storage controlling means for storing time series data at an arbitrary sampling period $\Delta T0$ concerning an arbitrary object, storing time series data at a sampling period $\Delta Ti$ (i is an integer of one or more) longer than the sampling period $\Delta T0$ concerning the above object, repeating an operation of storing the time series data at the sampling period $\Delta Ti$ by at least one time or more times, and storing the time series data at the plurality of sampling periods in a recording medium in a state that the data are hierarchically related.

Preferably, the above time series data base system further comprising a data read-out controlling means for appropriately selecting and reading out the time series data stored in the above recording medium among the time series data at the plurality of sampling periods in response to a requirement of reading out, and a means for displaying thus read out time series data in a graph.

Further, the above data read-out controlling means initially selects and reads out coarse data at a long sampling period coarsely displayed by the means for displaying, and succeedingly selects and reads out dense data at a short sampling period more densely displayed by the means for displaying than in the coarse data. Further, gradually thereafter, the jth dense data (j is an integer of 2 or more) at a sampling period shorter than that of the above first dense data are selected and read out.

Substitutionally, the data read-out controlling means selects and reads out data such as a time schedule at a predetermined sampling period suitable for a manner of displaying time series data in the above means for displaying in response to the above requirement of reading out.

In thus constructed time series data base system, because it is possible to easily select time series data at an arbitrary time period in an arbitrary sampling period out of the time series data at the plurality of sampling periods stored in the recording medium, requisite data are efficiently read out at a high speed.

A first recording medium recording time series data according to the present invention is that the time series data at a plurality of sampling periods, different with respect to a predetermined object, are stored in a state such that respective time series data are hierarchically related. Preferably, time series data of a short period sampled at an arbitrary sampling period $\Delta T0$ concerning an arbitrary object and time series data of long period of at least one or more sampled at a sampling period $\Delta Ti$ (i is an integer of 1 or more) longer than the above sampling period $\Delta T0$ concerning the above object are stored in a state such that the respective time series data at the above plurality of sampling periods are hierarchically related.

In a system utilizing thus constructed recording medium, because time series data at an arbitrary sampling period and an arbitrary time are easily selected and read out of the stored time series data at the plurality of sampling periods, it is possible to efficiently execute a process of reading out requisite data at a high speed.

A first time series data displaying system according to the present invention is characterized by comprising a means for controlling to store data which stores time series data at an arbitrary sampling period $\Delta T0$ concerning an arbitrary object, stores time series data at sampling periods $\Delta Ti$ (i is an integer of 1 or more) longer than the above sampling period $\Delta T0$ concerning the above object, repeats an operation of storing the time series data at the sampling periods $\Delta Ti$ by at least one time or more times, and stores the time series data at the plurality of sampling periods in a state that the time series data at the plurality of sampling periods are hierarchically related, a means for controlling to read out data which appropriately selects and reads the time series data stored in the above recording medium out of the time series data at the plurality of sampling periods upon a request of reading out, and a display means which displays thus read out time series data in a graph as trend data for showing a tendency of the time series data concerning the above object.

In thus constructed time series data displaying system, because time series data at an arbitrary sampling period and an arbitrary time are easily selected and read out of the time series data at the plurality of sampling periods stored in the recording medium and displayed in a graph as trend data, it is possible to efficiently execute a process of reading out and displaying requisite data at a high speed.

A first method for processing time series data according to the present invention is characterized by comprising a step of sampling a basic data in which data at sampling periods $n\times\Delta T0$ (n is the number obtained by raising 2 to powers) and having a phase of 0 based on a predetermined time are sampled out of time series data at an arbitrary sampling period $\Delta T0$ concerning an arbitrary object, and a step of sampling hierarchical data in which data at sampling periods $n/2^{m-1}\times\Delta T0$ (m is an integer of 1 or more) having a phase $n/2^m\times\Delta T0$ based on the above predetermined time are sampled as a mth hierarchical data out of the above time series data, wherein the above step of sampling hierarchical data is repeated by at least one time or more times; and the time series data at the plurality of sampling periods are hierarchically arranged. Preferably, the step of sampling hierarchical data is repeated until $n/2^m=1$ is established and hierarchical time series data including data having the amount substantially same as that of the time series data before sampling are formed.

More preferably, in the above method for processing the first time series data, the step of sampling basic data and the step of sampling hierarchical data are processed when the above time series data are written in the recording medium in which the above time series data are stored.

Further, in the above method for processing the first time series data, the above step of sampling basic data and the above step of sampling hierarchical data are conducted when the above time series data are read out of the recording medium storing the above time series data and temporality stored in a memory.

In the above method, when the time series data are sampled by changing sampling periods so that the time series data at an original sampling period $\Delta T0$ are not overlapped, it is possible to form hierarchical time series data accessible at a high speed without increasing the amount of data.

A second method for processing time series data according to the present invention is characterized by comprising a step of arranging data which samples a basic data at sampling periods n×ΔT0 (n is obtained by raising 2 to powers) of a phase of 0 based on a standard of a predetermined time and the mth hierarchical data being data at sampling periods n/$2^{m-1}$×ΔT0 (m is an integer of 1 or more, of a phase n/$2^m$×ΔT0 based on a standard of the above predetermined time out of time series data at an arbitrary sampling period ΔT0 concerning an arbitrary object when processing the above time series data, and forms hierarchical time series data hierarchically arranging these time series data at the plurality of sampling periods, and a step of accessing data which initially accesses the above basic data when accessing the above time series data and sequentially accesses first upper hierarchical data in the above mth hierarchical data.

More preferably, in the above second method for processing time series data, the above step of accessing data is processed at a time of displaying in a means for displaying after reading out the above time series data out of the recording medium storing the above time series data.

Substitutionally, in the above second method for processing time series data, the step of accessing data is processed at a time of transmitting the above time series data through a network after reading out of the recording medium.

In the above method, by sequentially accessing from the upper hierarchical data in accessing the time series data, it is possible to initially acquire schematic time series data and gradually acquire detailed data, whereby data at a target sampling period are obtainable at a high speed using a minimum amount of time series data.

A first recording medium, in which a data processing program according to the present invention is recorded, is characterized by recording the program comprising a step of sampling basic data which samples data at sampling periods n×ΔT0 (n is obtained by raising 2 to powers) of a phase of 0 based on a standard of a predetermined time as basic data among time series data at an arbitrary sampling period ΔT0 concerning an arbitrary object at a time of processing the above time series data and a step of sampling hierarchical data which samples data at sampling periods n/$2^{m-1}$×ΔT0 (m is an integer of 1 or more) of a phase n/$2^m$×ΔT0 based on a standard of the above predetermined time out of the above time series data as the mth hierarchical data are included; and the step of sampling hierarchical data is repeated by at least one time or more to record the data processing program for hierarchically arranging time series data at a plurality of sampling periods.

In the recording medium in which the above data processing program is recorded, because time series data are sampled by changing sampling periods so that time series data at an original sampling period ΔT0 are not overlapped, it is possible to form hierarchical time series data which are accessible at a high speed without increasing the amount of data.

A second recording medium, in which a data processing program is recorded according to the present invention, is characterized by that a step of arranging data which samples basic data being data at sampling periods n×ΔT0 (n is obtained by raising into powers) of a phase of 0 based on a standard of a predetermined time and the mth hierarchical data being data at sampling periods n/$2^{m-1}$×ΔT0 (m is an integer of 1 or more) of phases n/$2^m$×ΔT0 based on a standard of the above predetermined time out of time series data at an arbitrary sampling period ΔT0 concerning an arbitrary object when the above time series data are processed and forms hierarchical time series data by hierarchically arranging these time series data at the above plurality of sampling periods and a step of accessing data which initially accesses the above basic data when accessing the time series data and sequentially accesses the first upper hierarchical data in the above mth hierarchical data are included in the data processing program.

In the recording medium, in which the above data processing program is recorded, it is possible to initially acquire schematic time series data and gradually acquires detailed data by sequentially accessing from upper hierarchical data when accessing the time series data, whereby data at a target sampling period is obtainable at a high speed using a minimum amount of time series data.

A second recording medium, in which time series data are recorded in the present invention, is characterized by that it is a recording medium in which time series data at an arbitrary sampling period ΔT0 concerning an arbitrary object are recorded, which samples basic data being data at sampling periods n×ΔT0 (n is obtained by raising 2 to powers) of a phase of 0 based on a standard of a predetermined time and the mth hierarchical data being data at sampling periods n/$2^{m-1}$×ΔT0 (m is an integer of 1 or more) of phases n/$2^m$×ΔT0 based on a standard of the above predetermined time out of the above time series data; and these time series data at the above plurality of sampling periods are recorded by hierarchically arranging.

The recording medium, in which the above time series data are recorded, it is possible to provide a time series data structure which can efficiently executes processes such as storing, reading out, and transferring data at a high speed without increasing the amount of data.

A first system of processing time series data according to the present invention is a system of processing time series data which processes time series data at an arbitrary sampling period ΔT0 concerning an arbitrary object, characterized by comprising a means for controlling to arrange data, which samples data at sampling periods n×ΔT0 (n is obtained by raising 2 to powers) of a phase 0 based on a standard of a predetermined time and the mth hierarchical data being data at sampling periods n/$2^{m-1}$×ΔT0 (m is an integer of 1 or more) of phases n/$2^m$×ΔT0 based on a standard of the predetermined time out of the above time series data and hierarchically arranges these time series data at the above plurality of sampling periods, and a means for controlling data to store data, which stores thus hierarchically arranged time series data in the recording medium.

In the above structure, because time series data are sampled by changing sampling periods so that time series data at an original sampling period ΔT0 are not overlapped, it is possible to form hierarchical time series data which is accessible at a high speed without increasing the amount of data.

A second system of processing time series data according to the present invention is a system of processing time series data which processes time series data at an arbitrary sampling period ΔT0 concerning an arbitrary object, characterized by comprising a means for controlling to arrange data which samples data at sampling periods n×ΔT0 (n is obtained by raising 2 to powers) of a phase of 0 based on a standard of a predetermined time and the mth hierarchical data being data at sampling periods n/$2^{m-1}$×ΔT0 (m is an integer of 1 or more) of phases n/$2^m$×ΔT0 based on a standard of the above predetermined time out of the above time series data and hierarchically arranges time series data at the plurality of sampling periods, and a means for controlling to access data, which initially accesses the above basic data and sequentially accesses from the first upper hierarchical data in the above mth hierarchical data when accessing thus hierarchically arranged time series data.

In the above structure, by sequentially accessing from the upper hierarchical data when accessing the time series data, it is possible to initially acquire schematical time series data and gradually acquire detailed data, whereby data at a target sampling period can be acquired at a high speed using a minimum amount of time series data.

A third system of processing time series data according to the present invention is a system of processing time series data, which processes time series data at an arbitrary sampling period $\Delta T0$ concerning an arbitrary object, characterized by comprising a means for controlling to arrange data which samples data at sampling periods $n \times \Delta T0$ (n is obtained by raising 2 to powers) of a phase 0 based on a standard of a predetermined time as basic data and the mth hierarchical data being data at sampling periods $n/2^{m-1} \times \Delta T0$ (m is an integer of 1 or more) of phases $n/2^m \times \Delta T0$ based on a standard of the above predetermined time out of the above time series data and hierarchically arranges these time series data at the plurality of sampling periods, and a means for controlling to access data which accesses the basic data composing the time series data at a predetermined sampling period and hierarchical data corresponding thereto at the same time when accessing thus hierarchically arranged time series data.

At this time, a structure of the system for processing time series data can be similarly applied to a method for processing time series data, steps of arranging data in a computer readable recording medium which records a program of processing time series data, steps of accessing data in such recording medium, and so on.

In the above structure, by accessing both of the basic data composing the time series data at a predetermined sampling period and hierarchical data corresponding thereto at the same time of accessing the time series data, desirable time series data at a most suitable sampling period can be acquired at a high speed.

A second time series data base system according to the present invention is characterized by comprising a plurality of recording mediums which respectively store a plurality of groups of time series data concerning an arbitrary object by each of the groups, and a means for controlling to read out data which respectively connected to the plurality of recording mediums and controls a process of reading out and a process of transferring the time series data stored in the recording mediums.

In thus constructed time series data base system, because the plurality of groups of time series data are dispersedly stored, it is possible to efficiently and freely read out requisite time series data out of a great amount of time series data belonging to the plurality of groups. Further, it is possible to easily add, change, or delete groups of time series data.

A second system for displaying time series data according to the present invention is characterized by comprising a plurality of recording mediums which respectively store a plurality of groups of time series data concerning an arbitrary object by each of the groups, a display means which is connected to the above plurality of recording mediums through a network and displays arbitrary time series data in an arbitrary group stored in the above recording mediums, and a means for controlling to read out data which is connected to the above recording mediums and the above display means and controls a process of reading out the time series data stored in the recording mediums and a process of transferring to the display means.

Preferably, the display means includes a means for designating data which accesses the above means for controlling to read out data through a network and designates time series data requisite for display, and the above means for controlling to read out data includes a means for transferring data which transfers the designated time series data to the display means after reading out the time series data from the recording mediums. In this case, preferably, the display means designates time series data requisite for display based on address information of the means for controlling to read out data, tag information for recognizing each time series data stored in the recording mediums, and date information showing a time of the above time series data, and the above means for controlling to read out the data reads out data at a corresponding time out of the time series data corresponding based on the above designation and transfers these to the display means.

More preferably, the time series data stored in the recording mediums are stored in a state that respective time series data at a plurality of different sampling periods are hierarchically correlated.

In the above structure, the respective time series data in the plurality of groups are dispersedly stored, it is possible to efficiently and freely read out requisite time series data such as data at a desirable time in desirable time series data out of a great amount of time series data belonging to the plurality of groups. Further, it is possible to easily add, change, and delete groups of time series data. In the display means, it is sufficient that information for designating time series data requisite for display is included, whereby a memory capacity for information can be reduced and a structure of device is simplified. Especially, by storing time series data at the plurality of different sampling periods in the recording mediums in a state that the respective time series data are hierarchically correlated, processes of reading out and transferring the time series data can be executed at a high speed.

A third method for processing time series data according to the present invention is a method for processing time series data in a system of displaying time series data including recording mediums respectively storing time series data in a single group or a plurality of groups concerning an arbitrary object, characterized by comprising a step of designating data which accesses a means for controlling to read out data which controls a process of reading out time series data stored in the recording mediums through a display means and a network and designates time series data requisite for display, and a step of transferring data which reads out thus designated time series data from the recording mediums and transfers to the display means.

Preferably, in the above step of designating data, the time series data requisite for display are designated based on address information of the above means for controlling to read out data, tag information for recognizing respective time series data stored in the above recording mediums, and date information which shows a time period of the time series data; and in the above step of transferring data, data at a time period corresponding to thus designate time series data are read out and transferred to the above display means.

More preferably, the time series data stored in the recording mediums are stored in a state that the respective time series data at a plurality of different sampling periods are hierarchically correlated.

In the above method, it is possible to efficiently and freely read out requisite time series data such as data at a desirable time in desirable time series data out of a great amount of time series data belonging to a single group or a plurality of groups. Especially, in the recording mediums, by storing time series data at a plurality of different sampling periods in a state that the respective time series data are hierarchically correlated, it is possible to execute processes of reading out and transferring time series data at a further higher speed.

A third system of displaying time series data according to the present invention is characterized by comprising recording mediums which respectively store a single group or a plurality of groups of time series data concerning an arbitrary object by each of the groups, a display means connected to the above plurality of recording mediums through a network and displays arbitrary time series data in an arbitrary group stored in the above recording mediums, and a means for controlling to read out data which is connected to the above recording mediums and controls processes of reading out the time series data stored in the above recording mediums and processes of transferring to the above display means, wherein the above display means includes a means for designating data which accesses the above means for controlling to read out data through a network and designates time series data requisite for display, and a means for displaying plural which independently displays a plurality of time series data read out by requiring thus designated means for controlling to read out data by a plurality of times.

Preferably, the above means for displaying plural shows the above plurality of time series data respectively in graphs and displays a plurality of independent graphs. In this case, the plurality of graphs showing the time series data in each group of the above plurality of groups are arranged and displayed by substantially closely arranging these graphs; a plurality of graphs showing data at different times of predetermined time series data in the above single group or plurality of groups are substantially closely arranged and displayed each other; or a plurality of graphs showing predetermined time series data in the above single group or plurality of groups in different time scales are substantially closely arranged and displayed.

In the above structure, because a plurality of time series data are displayed by a plurality of independent graphs, it is possible to easily display a trend of the plurality of time series data in a mode, i.e. desirable group, type, time period, and time scale, required by a user at a high speed.

A fourth method for processing time series data according to the present invention is a method for processing time series data in a system of displaying time series data having recording mediums respectively storing a single group or a plurality of groups of time series data concerning an arbitrary object by each of the groups, characterized by comprising a step of designating data which accesses a means for controlling to read out data which controls processes of reading out time series data stored in the recording mediums through a display means and a network and designates time series data requisite for display, a step of transferring data which reads out thus designated time series data out of the above recording mediums and transfers to the display means, and a step of displaying plural which independently displays a plurality of time series data read out by requiring thus designated means for controlling to read out data so as to read out by a plurality of times. Preferably, in the step of displaying plural, the above plurality of time series data are respectively graphed and displayed by a plurality of independent graphs.

In the above method, because a plurality of time series data in a single group or plurality of groups are displayed by a plurality of graphs independent each other, it is possible to easily display a trend of the plurality of time series data in a mode, i.e. desirable group, type, time period, and time scale, required by a user at a high speed.

Incidentally, to the method for storing time series data, the time series data base system, the method for processing time series data, the system for processing time series data, the system for displaying time series data, and the recording mediums, data showing conditions of various portions of an industrial plant are applicable as the time series data.

BRIEF DESCRIPTION OF THE DRAWINGS

[FIGS. 8A and 8B] Explanatory drawings for showing an example of trend display by time series data at different sampling periods.

[FIG. 9] An explanatory drawing for illustrating an example of processing to read out data with respect to a requirement of displaying an arbitrary time scale.

[FIG. 15] An explanatory drawing for illustrating an example of processing to read out data when it is required to display data through a network.

[FIG. 17] An explanatory drawing for illustrating a method for arranging and storing time series data according to Second Embodiment of the present invention.

[FIG. 34] An explanatory drawing for illustrating an example of processing to independently display trend data on a plurality of trend graphs.

[FIG. 35] An explanatory drawing for showing a practical example of displaying concerning an independent display of a plurality of trend graphs.

[FIG. 36] An explanatory drawing for showing a practical example of displaying concerning an independent display of a plurality of trend graphs.

[FIGS. 37A–37C] Explanatory drawings concerning a function of cutting out numerical data with respect to trend data.

[FIGS. 39A and 39B] Explanatory drawings for showing an example of displaying on a screen at time of reading out information for setting a display on a trend graph screen.

BEST MODE FOR CARRYING OUT THE INVENTION

Hereinbelow, embodiments of the present invention will be described in reference of FIGS.

[First Embodiment]

Figure 1:
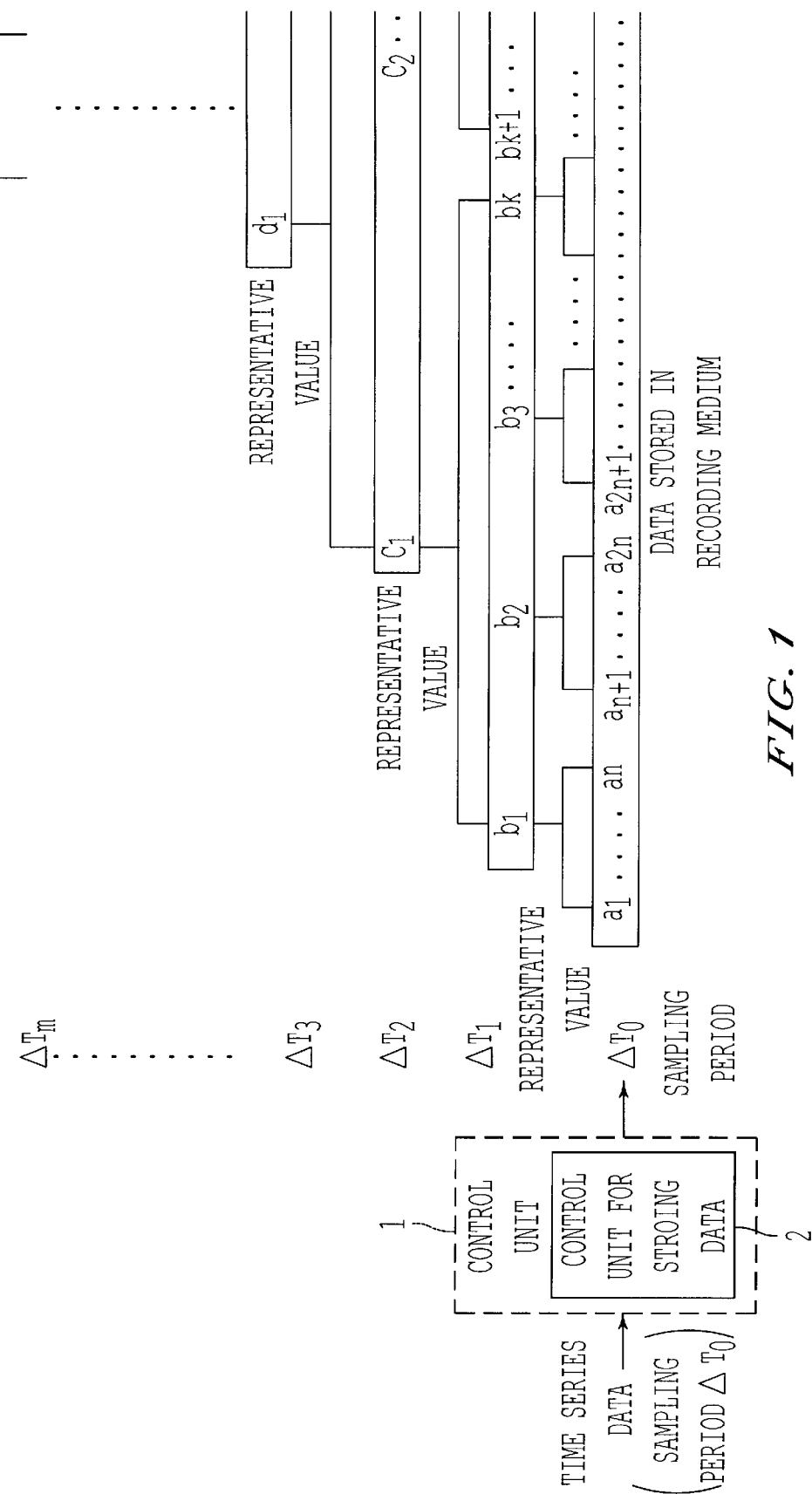
[FIG. 1] A drawing explaining a method for storing time series data according to First Embodiment of the present invention.
Figure 2:
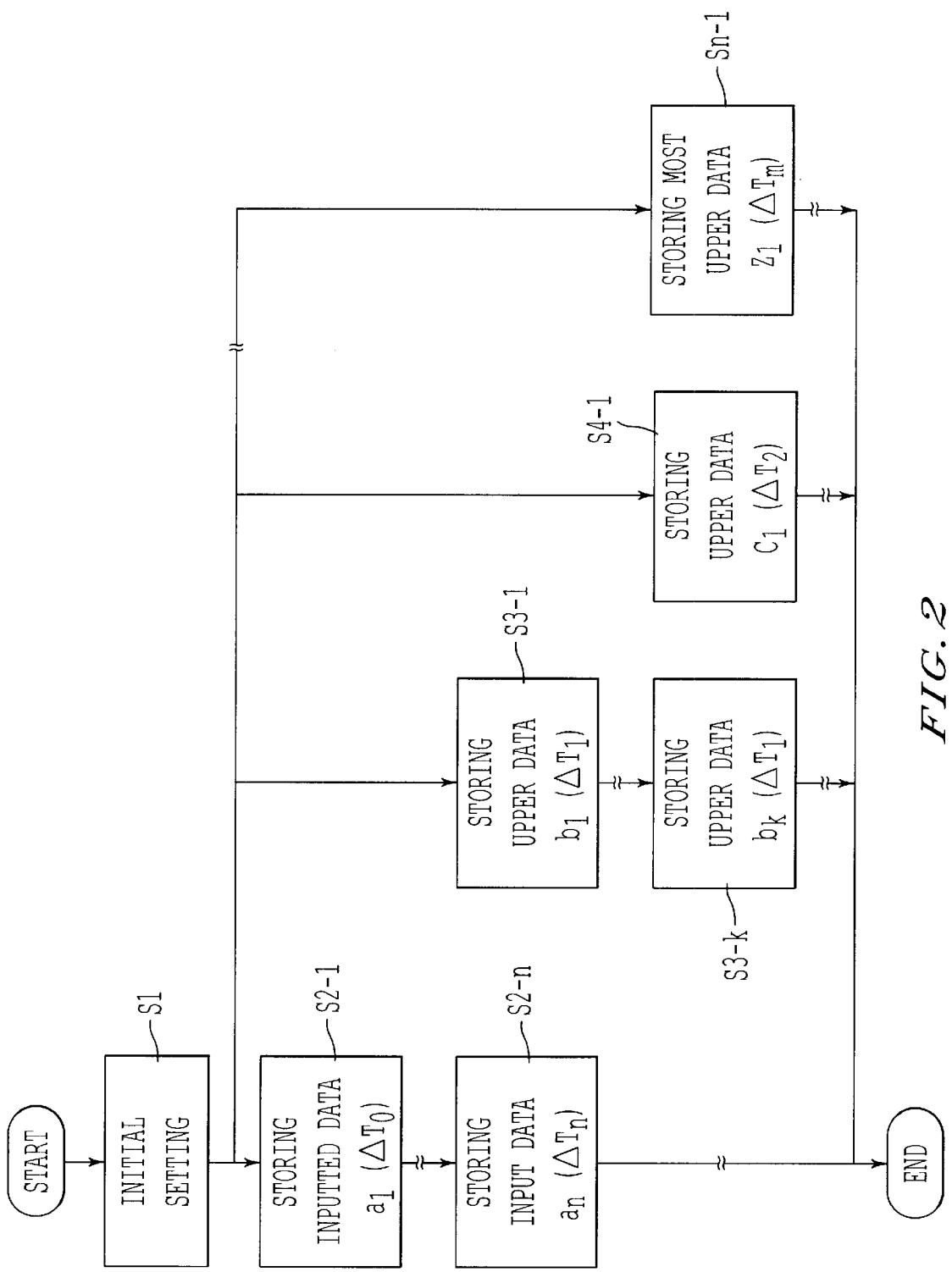
[FIG. 2] A flow chart showing steps of processing to store time series data according to First Embodiment.

As the First Embodiment according to the present invention, a method for hierarchically storing time series data in a method for storing time series data will be described based on FIGS. 1 and 2. FIG. 1 is an explanatory drawing for illustrating the method for storing time series data; and FIG. 2 is a flow chart for illustrating steps of processing to store the time series data.

When a great amount of time series data acquired in an industrial plant and so on, which data may be raw data acquired from a plant or data subjected to some kind of processing, are stored in a recording medium. As illustrated in FIG. 1, inputted time series data $a1, a2, a3, \ldots$ at a sampling period $\Delta T0$ are serially stored as-are and converted into time series data having a plurality of sampling periods of $\Delta T1$ through $\Delta Tm$, being longer than $\Delta T0$ to succeedingly being stored while hierarchically correlated each other in accordance with the sampling period in an independent manner. The time series data at each sampling period are correlated to at least one of data in other hierarchy such as neighbor upper and lower hierarchies. In other words, data in a hierarchy are related to correspond with at least one of data in the other hierarchies.

Although the time series data at the above plurality of sampling periods schematically have a hierarchical structure, each of the time series data is recorded as, for example, a file in a recording medium. The time series data at a single sampling period may be divided into a plurality of files and recorded. Data in respective hierarchies may be correlated to make the control unit 1 for controlling these time series data have linkable information such as time information, tag information, or each of time series data itself may have linkable information being able to link. Further, time series data to be stored may be recorded in a state that data are compressed using, for example, a known differential compressing method.

Further, the time series data are not limited to data concerning an industrial plant and may be any time series data such as a transition of a stock price or a price of commodity. Various mediums such as a magnetic disk such as a hard disk, an optical magnetic disk, an optical disk, and a magnetic tape may be used as the above recording medium.

FIG. 2 is a flow chart for illustrating steps of processing to store time series data according to this Embodiment. At first, in Step S1, a plurality of sampling periods, the number of time series data groups, and so on are set as an initial setting. In the next, in Step S2-1, sequentially inputted time series data $a1, a2, a3, \ldots$ at the sampling period $\Delta T0$ are serially stored as-are as lowest data. In Step S2-n, after lapsing a predetermined time $\Delta T1$, a predetermined sampling period longer than $\Delta T0$, and accumulating data as much as n. In Step S3-1, a representative value b1 of the data a1 through an in the time is stored in another file in an upper hierarchy as upper data. In Step S3-k, this process is repeated until a predetermined time $\Delta T2$, i.e. a predetermined sampling period longer than $\Delta T1$, lapses and data as much as k are accumulated. Thereafter, in Step S4-1, a representative value c1 of the data b1 through bk in the time is stored in another file in further upper hierarchy as upper data. Such representative values are applied by calculating a value such as an arithmetical means or a median value of time series data in a corresponding time.

In Step Sh-1, the above process is repeated until most upper data $z1$ at a sampling period $\Delta Tm$ are stored. Thereafter, this process of storing are sequentially repeated along with a lapse of time. By this, time series data at a plurality of sampling periods $\Delta T0$ through $\Delta Tm$ as much as $m+1$ are respectively stored as illustrated in the right of FIG. 1 and a hierarchical time series data base is constructed in the recording medium.

Figure 3:
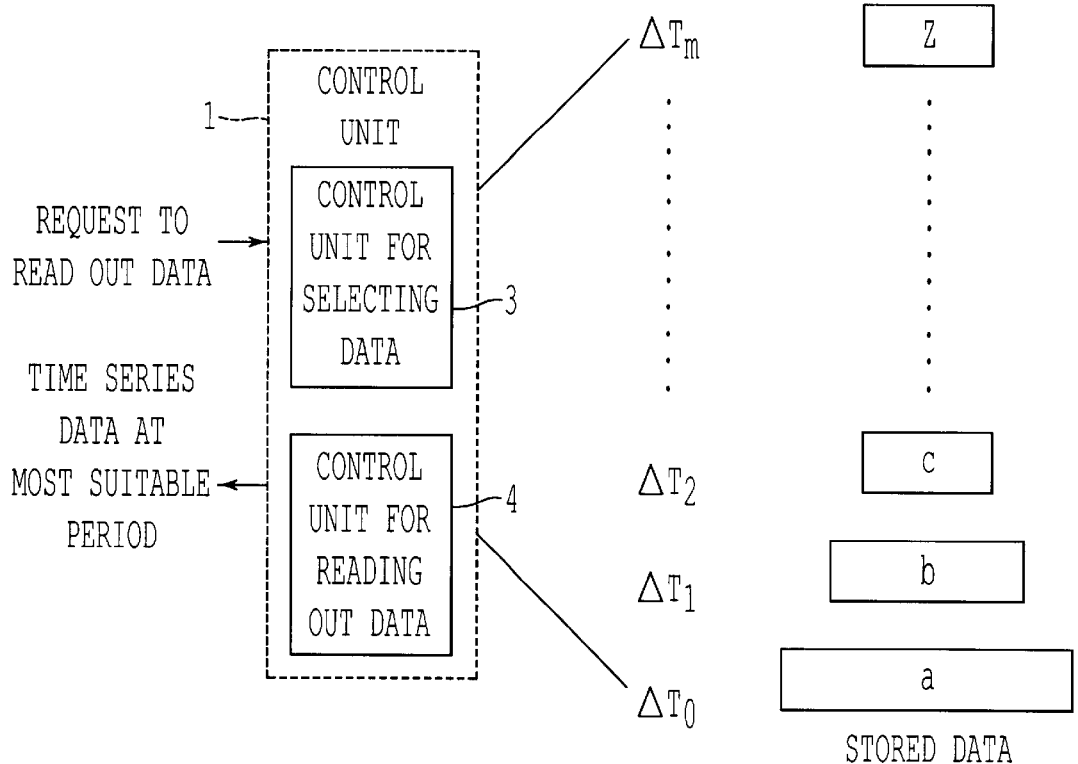
[FIG. 3] An explanatory drawing for showing a process of reading out data from hierarchical time series data base according to First Embodiment.

In the next, a process of reading out data out of thus stored hierarchical time series data base will be described in reference of FIG. 3. When a request of reading out data is given to the hierarchically stored time series data, it is judged which sampling period is most suitable for reading out in data selection controlling unit provided in the controlling unit 1 working as a means for controlling to read out data, and a file of time series data at a most suitable sampling period is accessed and read out by a data read out controlling unit 4 also working as a means for controlling to read out data.

In this, how the data selection control unit 3 judges a most suitable sampling period may be set in accordance with necessity. Several examples of a process of reading out time series data will be described in latter applicable examples.

Figure 40:
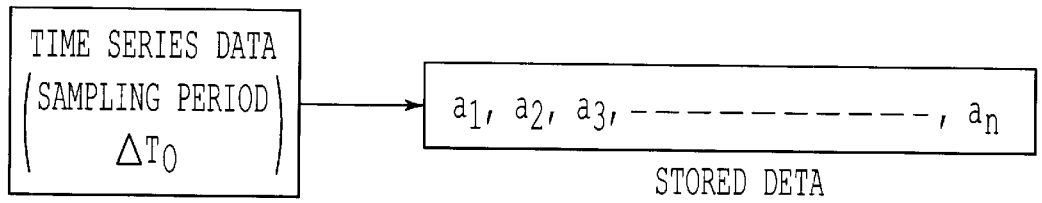
[FIG. 40] An explanatory drawing for illustrating an example (serial storage, inseparate type) of a conventional method for storing time series data.
Figure 41:
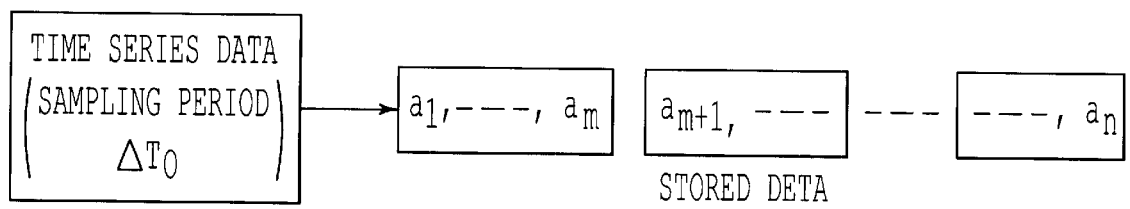
[FIG. 41] An explanatory drawing for illustrating another example (serial storage, separate type) of a conventional method for storing time series data.

When time series data at the sampling period $\Delta T0$ are serially stored by the conventional method for storing data illustrated in FIGS. 40 and 41, it is not possible to efficiently read out data upon various requests to read out data.

On the contrary, when the time series data are previously stored at a plurality of sampling periods as described in this embodiment, it is possible to easily select and read out data at a most suitable sampling period in an arbitrary time period upon various requests to read out data, whereby it is possible to trim an unnecessary process of reading out data and data can be efficiently read out. Accordingly, even in case of storing a great amount of data, a series of process for reading out requisite data can be processed at an extremely high speed.

In the next, an applicable example of the system for processing time series data utilizing a method for hierarchically storing time series data according to First Embodiment applied to a trend displaying system for displaying trend of time series data (trend data) will be described.

Figure 4:
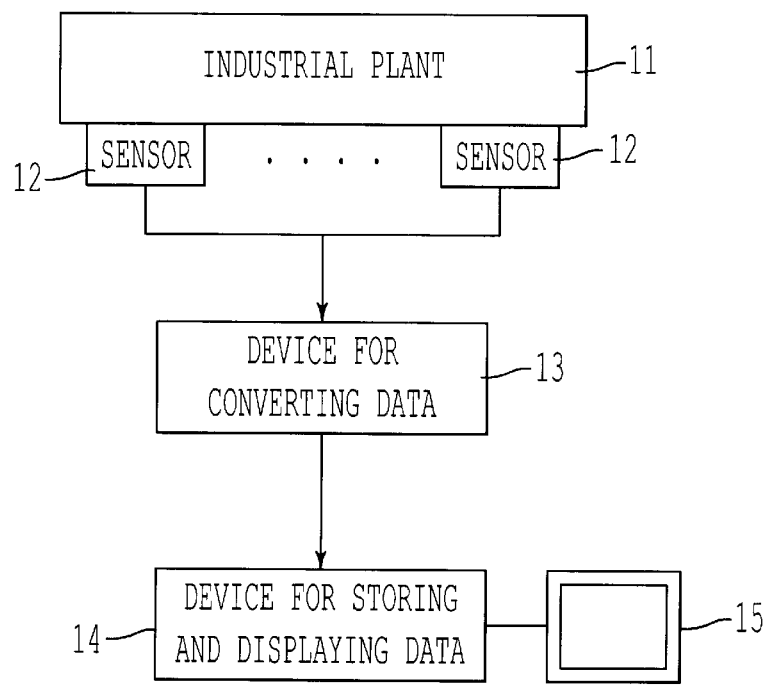
[FIG. 4] A block chart illustrating a system structure for displaying trend data of an industrial plant in graphs as a first example of constructing a trend displaying system.

FIG. 4 illustrates a first structure of the trend display system, wherein a system of displaying trend data in graphs utilized in an industrial plant such as a glass kiln will be described as an example.

The trend display system comprises a sensor 12 for detecting values representing various operational conditions such as temperatures and flow rates in various portions in an industrial plant 11, a device for converting data 13 which converts measured values detected by the sensor 12 into digital data, a device for storing and displaying trend data 14 which inputs the measured data sent from the device for converting data 13 in time series, hierarchically stores the time series data in a recording medium, reads the time series data stored in response to a requirement of a user out of the recording medium, and outputs to display, and a monitor 15 as a display means which displays trend data outputted from the device for storing and displaying trend data 14 in a screen. The device for converting data 13 comprises an A/D converter, and CPU, which can be substituted for a computer equipped with a board for inputting analogue data. The device for storing and displaying trend data 14 is constituted by a computer, e.g. a work station and a personal computer, equipped with CPU, a memory, and so on.

Figure 5:
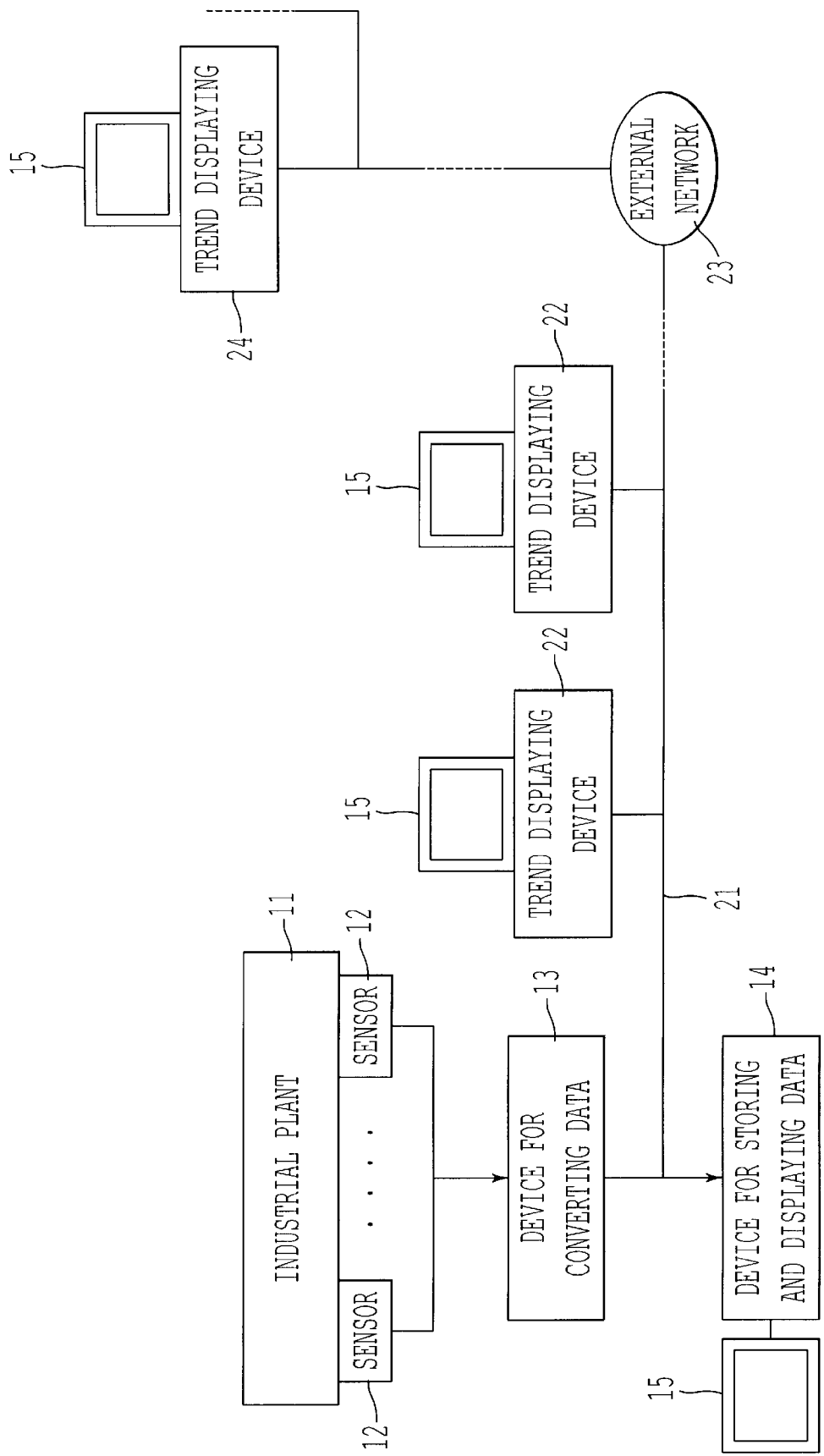
[FIG. 5] A block chart showing a system structure for displaying trend data at a remote location utilizing a network as a second example of constructing a trend displaying system.

A second example of constructing the trend display system of displaying trend data at a remote location using a network is illustrated in FIG. 5. The second example is constructed in addition to the structure illustrated in FIG. 4 that a plurality of trend display devices 22 and monitors 15 are connected through a local network 21 such as an ethernet to the device for storing and displaying trend data 14. Further, the local network 21 is connected to an external network 23 such as a public communication network, a personal circuit, and an internet and also connected to a trend display device 24 and a monitor 15 at a remote location through this external network 23. The trend display devices 22, 24 are constructed by a computer such as a personal computer equipped with CPU, a memory, and so on.

In this trend display system, time series data of the industrial plant 11 detected by the sensor 12 and converted into digital data by the device for converting data 13 are hierarchically stored in the recording medium such as a hard disk as illustrated in FIG. 1. Further, the trend data are graphed and displayed in the monitor 15 by appropriately processing to read out data out of the time series data stored in the recording medium in response to a request of displaying data by a user.

Figure 6A:
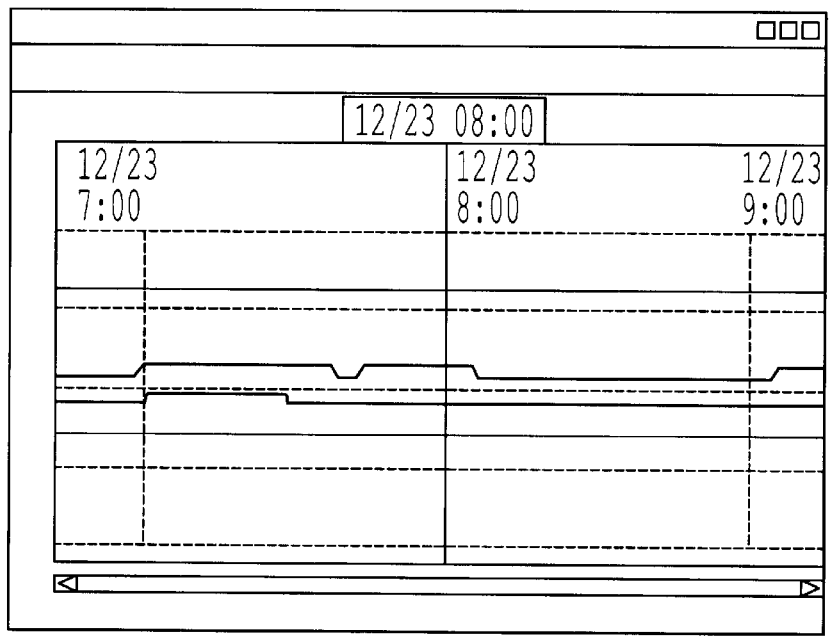
[FIGS. 6A–6C] Explanatory drawings for showing an example of trend display on a monitor screen.
Figure 6B:
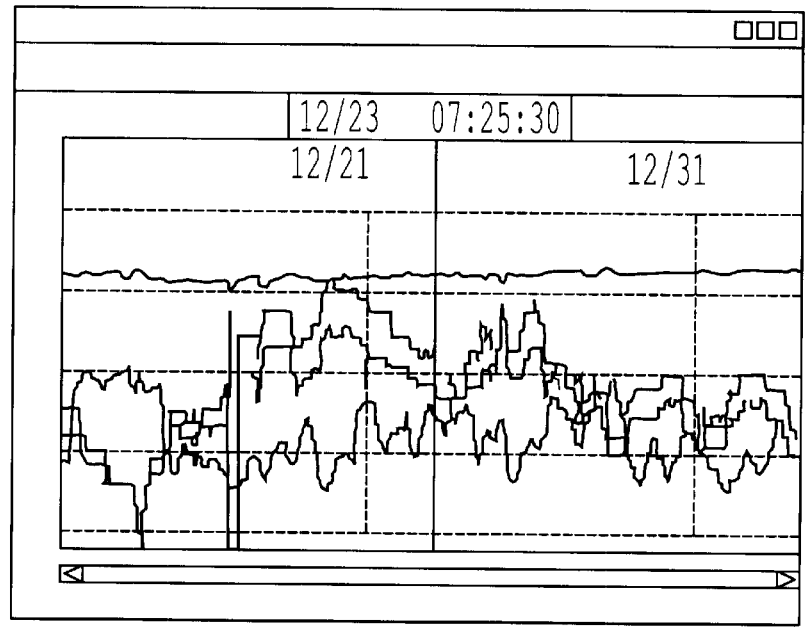
Figure 6C:
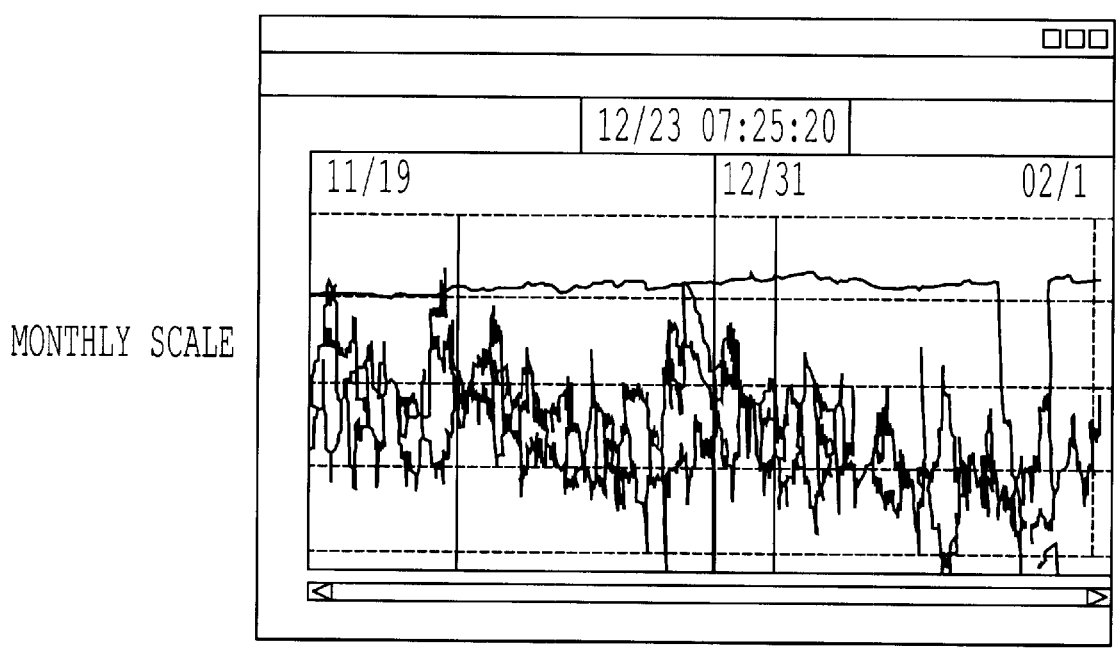

In a screen of the monitor 15, it is possible to display the trend data, hereinbelow referred to as trend display, in various time units such as (A) hourly scale, (B) weekly scale, and (C) monthly scale as illustrated in FIGS. 6A–6C. Time series data at a most suitable sampling period are read out in response to these various time scales and outputted to the monitor 15.

Figure 7A:
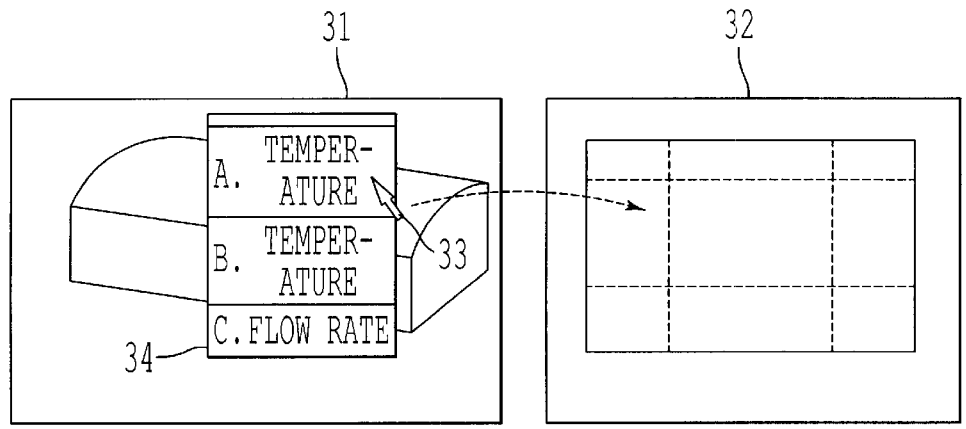
[FIGS. 7A–7C] Explanatory drawings for showing an example of user interface for conducting the trend display as in FIG. 6.
Figure 7B:
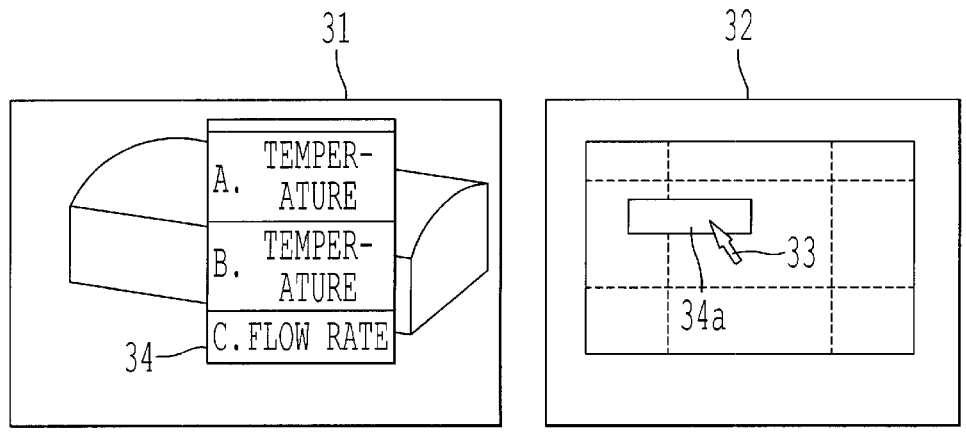
Figure 7C:
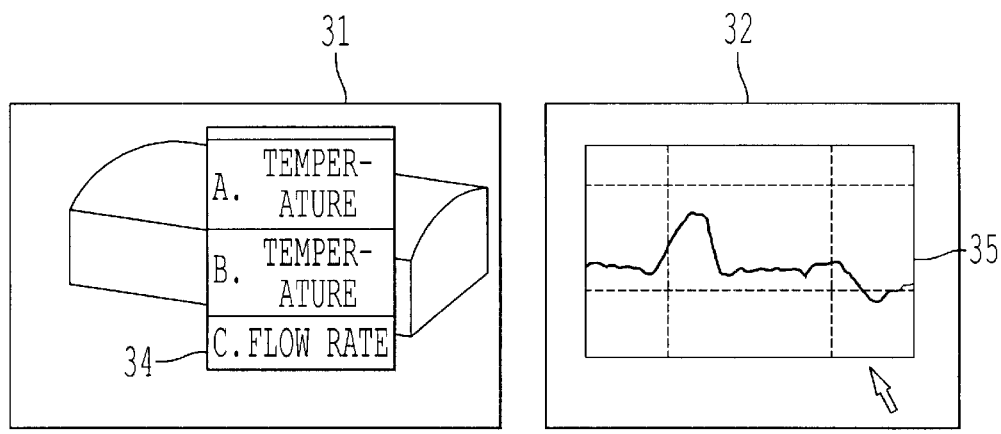

An example of a user interface for conducting trend display as shown in FIGS. 6A–6C is illustrated in FIGS. 7A–7C, respectively.

On the screen of the monitor 15, a plant screen 31 for displaying a schematic view of the industrial plant 11 and a trend graph screen 32 for displaying a graph of the trend data are provided. As illustrated in FIG. 7A, when a user designates an aimed portion of the plant in the plant screen 31 by a pointer 33, such as a mouse, and clicks the portion, a list 34 of items of the stored time series data concerning the portion is displayed by popping up. As illustrated in FIG. 7B, when the user clicks a desired data item $34a$ out of the item list 34 and moves this to drop on the trend graph screen 32 in a drag and drop operation, trend data 35 corresponding to the data item $34a$ are displayed on the trend graph screen 32 as illustrated in FIG. 7C.

It is possible to improve operability, and select a data item to be displayed, and display trend data with an easy operation using such a user interface.

Hereinbelow, several examples of processing to read out time series data in the trend display system of this applicable example will be described in the following.

(1-1) Operation of Displaying Trend Using an Arbitrary Time Scale

At a time of displaying trend data, there is a case that it is required to display in various time scales. For example, in case of displaying trend data in a short period scale, a long period scale, and so on, there is a requirement of switching displays in various time scales. In this case, there is a necessity of changing a sampling period of time series data read for displaying in response to a time scale to be displayed. When the sampling period is large with respect to a display time scale, a graph has a coarse displaying accuracy as shown in FIG. 8A. Adversely, when the sampling period is too short, the entire number of data is increased and a process of displaying takes an excessive time. Therefore, it is necessary to prepare data having appropriately short sampling periods, as shown in FIG. 8B.

Therefore, as a first example of processing according to First Embodiment will be described based on FIGS. 9 through 11 as an example of processing to read out data in which a high speed of response with respect to a requirement of displaying an arbitrary time scale is pursued.

In case that it is required to display a short period scale of the trend data storing and displaying device 14, time series data at a sampling period appropriately shorter than the display time scale are selected in consideration of an accuracy of displaying on a screen using the data selection controlling unit 3 in the controlling unit 16 as illustrated in FIG. 9, and trend data are processed to display by reading these by the data read out control unit 4 and transmitting to the monitor 15.

Figure 10:
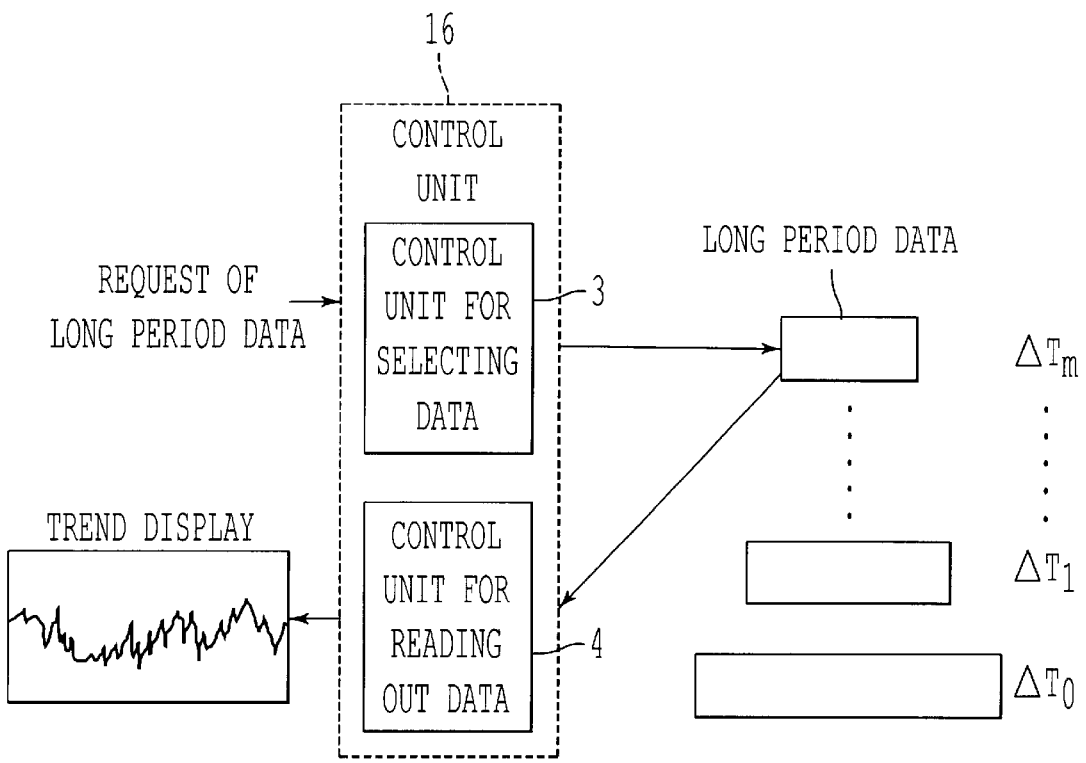
[FIG. 10] An explanatory drawing for showing an example of processing to read out data with respect to a requirement of displaying an arbitrary time scale.

Further, when it is required to display a long time scale, as illustrated in FIG. 10, a trend display is conducted by selecting time series data at an appropriately long sampling period within an allowable range in terms of an accuracy of displaying in screen by the data selection control unit 3. At this time, the sampling period to be selected is determined by a necessity of displaying several data in a single screen in reference of a period of displaying data and an accuracy of displaying in a screen. Thus, by selecting and reading out data at a predetermined appropriate sampling period suitable for a mode of displaying an arbitrary time scale and so on in response to a request of reading out corresponding to a request of displaying time series data, it is possible to instantaneously display trend data at an arbitrary time scale between a unit of second and a unit of year.

It is possible to display graphs in various time scales of displaying time series data such as a day, a month, an year, and a decade. In order to apply to various modes of displaying, data at an appropriate sampling period are read out upon a request so that, for example in case that the time scale is a day, data as much as 48 are sampled in a sampling period of 30 minutes, in case of a year, data as much as 365 are sampled in a sampling period of a day, and in case that the time scale is 10 years, data as much as 120 are sampled in a sampling period of a month.

Figure 11:
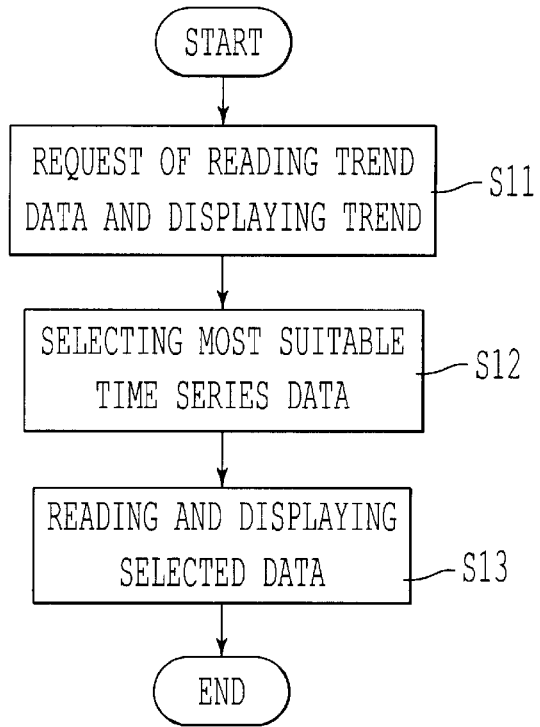
[FIG. 11] A flow chart for illustrating steps of processes of reading out and displaying trend data with respect to a requirement of displaying an arbitrary time scale.

FIG. 11 is a flow chart of displaying steps of processing to read out and display the above-mentioned trend data. When there is request of reading trend data and displaying trend from a user in Step S11, time series data at a most suitable sampling period are selected out of time series data at a plurality of sampling periods stored in a recording medium in response to a time scale of trend data required to display by the data selection control unit 3 in Step S12. In Step 13, time series data at a sampling period selected by the data read out control unit 4 are read out from the recording medium and displayed in the monitor 15.

As such, by independently storing the time series data at the plurality of sampling periods in a state that the time series data at the plurality of sampling periods are correlated in use of the method for storing time series data according to this embodiment, it is possible to easily select most suitable data and read out in response to a request of displaying data. By this process, it is possible to prevent unnecessary data from processing to read or there is no need to cull data at dense sampling periods, whereby the process can be efficiently executed at a high speed. Accordingly, it is possible to deal with a high speed with respect to various requests of displaying data, for example, the trend display can be instantaneously switched in different time scales.

Using the above-mentioned processes of reading out trend data and displaying, it is possible to display trend data and conduct a method for searching as follows.

In case such that a user analyzes trend data using a system of displaying trend, a method for searching data in an object time is to hierarchically search data while initially grasps an outline of trend by displaying coarse trend data in a long time scale and gradually or once selecting and switching a displaying time and an accuracy of displaying in reference of portions to be noticed for displaying trend data in a desirable time period and time scale. In use of such a method for searching, natural control feeling is obtainable for a user and, for example, workability for analyzing can be improved. In case that this operation of searching data is conducted, because time series data at various sampling periods corresponding to different time scales can be efficiently read out and displayed, it is possible to display trend at a high speed while searching desirable time series data.

Although, in a conventional system, a trend is displayed by searching target time series data based on a predetermined threshold value, a period, gradient, and so on, a user can view a monitor, in which trend data are displayed with good controllability in accordance with the trend display system of this applicable example.

(1-2) Operation of Display Such as Screen Scroll in Displaying Trend Data

Figure 12:
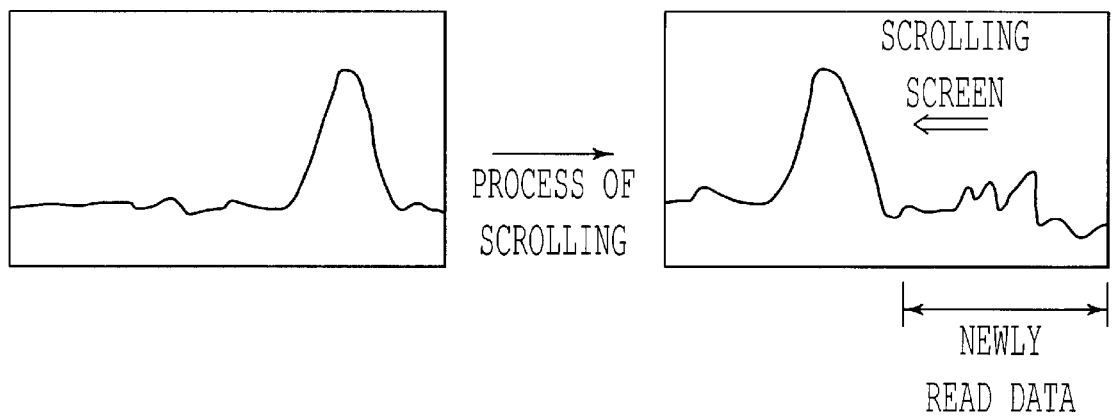
[FIG. 12] An explanatory drawing for showing an example of displaying at time of scrolling trend data on a screen.

When the trend data are displayed, cases of conducting various operations are anticipated, for example, that the user scrolls the screen as illustrated in FIG. 12. In response to these operations, it is necessary to change a displaying screen by a control by the control unit in the trend data storing and displaying device 14. In this case, although it is necessary to sequentially read out data in a newly displayed portion when the displaying screen is scrolled as in FIG. 12, it is not necessary to necessarily display the trend data on the screen with accuracy. There is non specific problem if it is possible to display to an extent that an outline of a trend is acknowledged by data at a coarse sampling period when it is operated to scroll.

Figure 13:
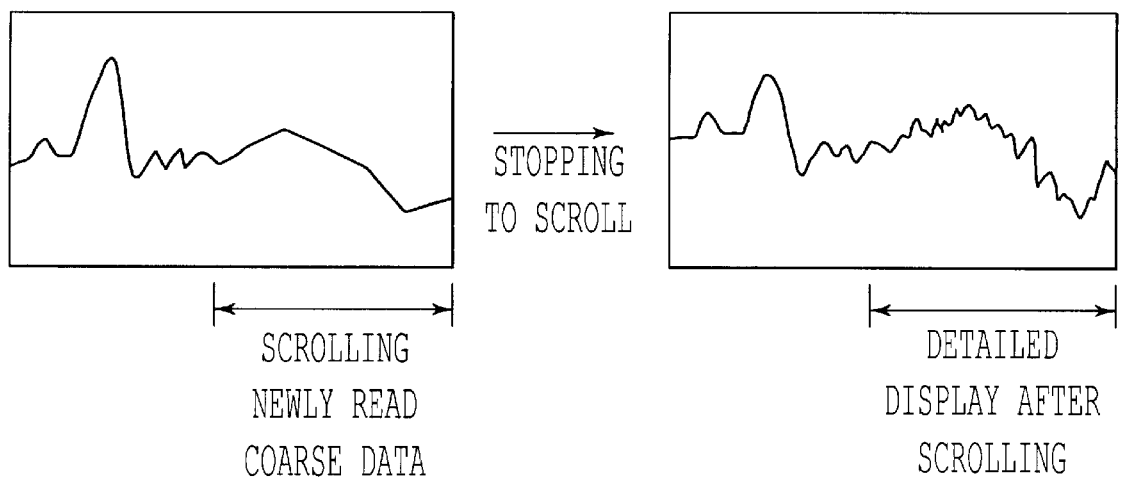
[FIG. 13] An explanatory drawing for showing an example of processing to display in case that an operation such as scrolling of trend data on a screen is conducted.

Therefore, as a second example of processing according to First Embodiment, an example of processing to read out data realizing a high speed in displaying data in a case such that an operation of scrolling is conducted will be described in reference of FIGS. 13 and 14. In this example, as illustrated in FIG. 13, data at a relatively coarse sampling period (coarse data, the amount of data is relatively small) are read and displayed at a time of operating to scroll by a data selection control unit 3 and a data read out control unit 4 as shown in FIG. 13 to conduct a display to an extent that an outline of the trend is recognized. When the scroll is stopped and the scrolling operation is finished, data at dense sampling period (dense data, the amount of data is relatively large) are read to an extent necessary for an accuracy of displaying on a screen and a detailed trend is displayed. At this time, depending on how far a display of operation of scrolling or the like is made coarse, the data selection control unit 3 determines a sampling period of data to be read.

Figure 14A:
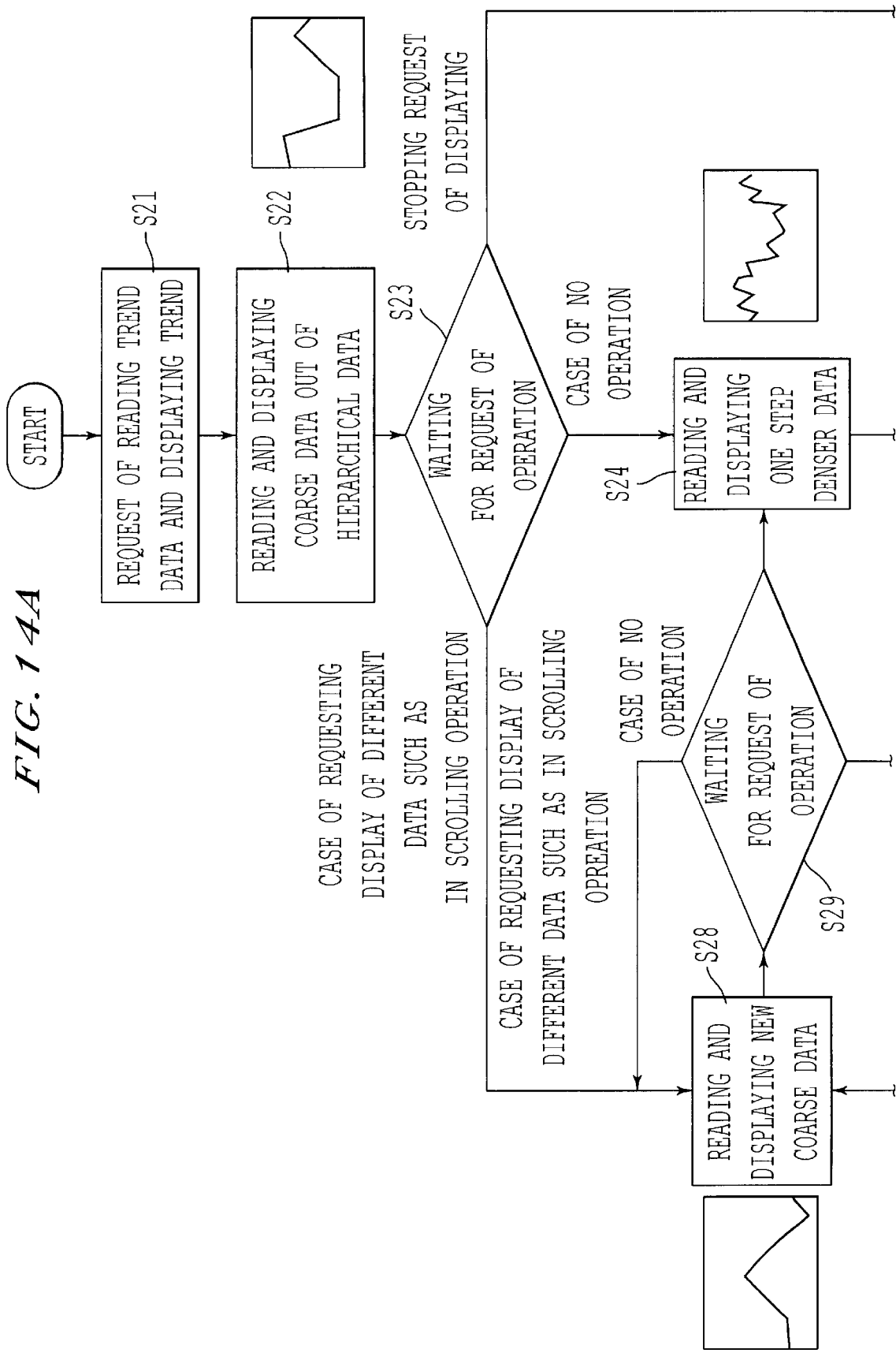
[FIG. 14] A flow chart for illustrating steps of processing to read out and display trend data with respect to an operation such as scrolling.
Figure 14B:
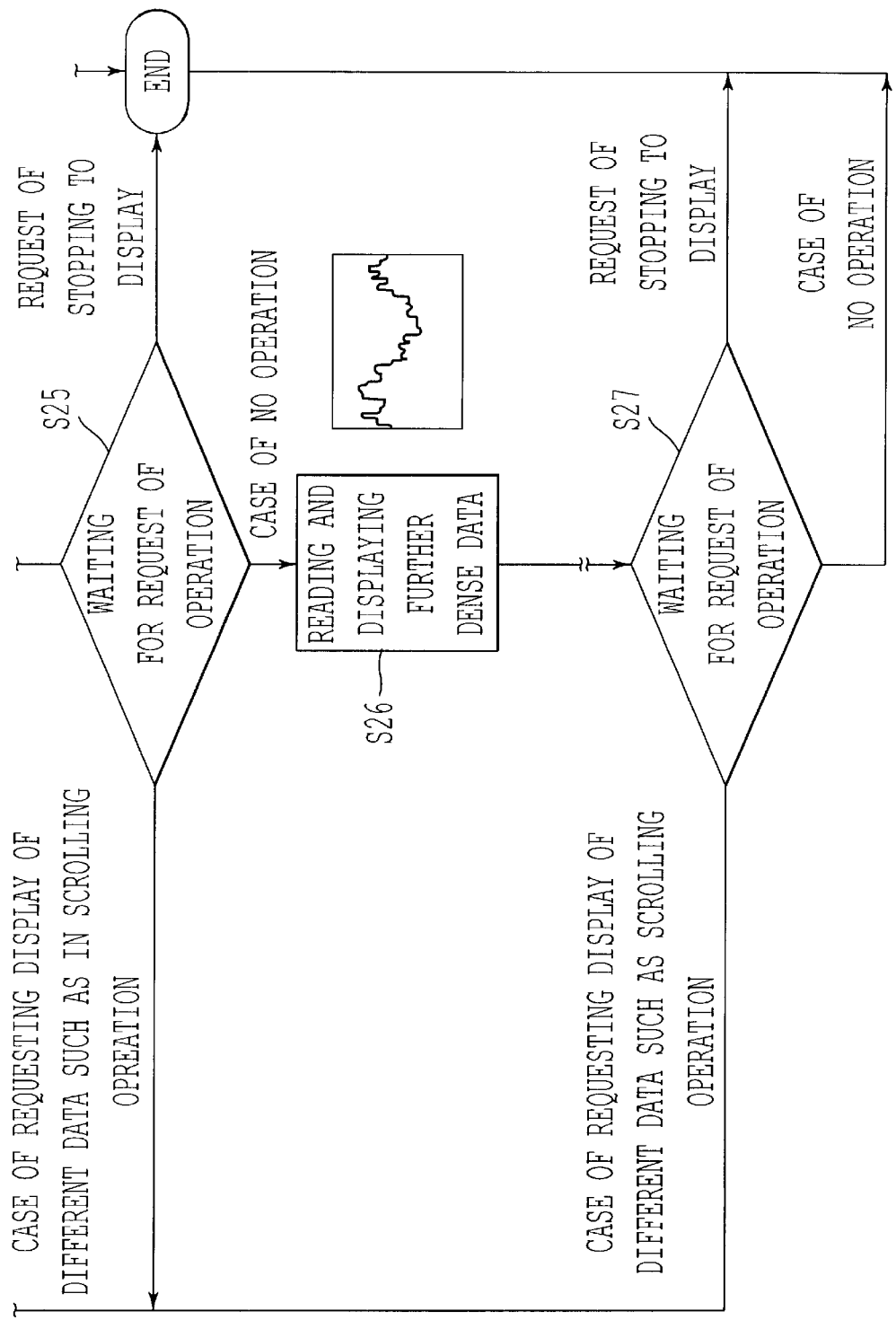

FIG. 14 is a flow chart for illustrating steps of processing to read out and display trend data with respect to operations such as the above-mentioned scrolling operation. When there are requests of reading out the trend data and displaying the trend from the user in Step S21, coarse data having a long sampling period are selected and read out of the hierarchically recorded time series data to be displayed on the monitor 15. In Step S23, it is waited for a predetermined time until the user motions to require to display different data such as a scrolling operation.

When there is no operation, Step S24 is processed to read out and display dense data which are in one step denser than the above coarse data. Thereafter, in Step S25, it is waited for a predetermined time until any motion is arisen by the user in a similar manner to that in Step S23. If there is no operation, Step S26 is processed to read and display dense data at a further short sampling period. These operations are repeated until densest data are displayed in response to a resolution power of displaying in the monitor 15 and a predetermined time is waited thereafter in Step S27. If there is no operation, the process is completed. By these Steps S23 through S27, dense data are gradually read out and graphs of the dense trend data are stepwisely displayed on the monitor 15.

When there is a motion of requesting to display different data, for example a scrolling operation, from the user in steps of waiting motion requests of Steps S23, S25, and S27, Step S28 is processed to read out and display coarse data of new trend data to be displayed in response to such a motion. Thereafter, in Step S29, a predetermined time is waited until a motion of the user is arisen in a similar manner to that in Step S23. In case that there is another motion, Step S28 is processed to read out and display new coarse data. In case that there is no motion in Step 29, Step S24 is processed to conduct operations of gradually reading out and displaying dense data in a similar manner to that described above. Further, when a motion of stopping the request of displaying is arisen by the user in steps of waiting to request the operations of Steps S23, S25, and S27, the processes are immediately finished.

In the above operation of requesting to display different data, an operation of displaying a plurality of screens by performing a trend display on another screen and so on are exemplified in addition to the above-mentioned scrolling operation. In such a process, it is possible to renew to be a new display by immediately canceling in case that instruction is erroneous by making a display of outline using coarse data gradually to be a detailed display using dense data.

With respect to a request of displaying trend data, in a similar manner to that in the above (1-1), time series data at a most suitable sampling period may be selected and displayed by reading out in consideration of an accuracy of displaying on a monitor screen for gradually reading out and displaying from coarse data to dense data only for operations such as scrolling.

Thus, in use of a method for storing time series data according to this embodiment and by independently storing time series data at a plurality of sampling periods in a correlated state, it is possible to improve a displaying speed using only an outline display of a small amount of data at relatively long sampling period under operations such as scrolling. Further, it is possible to conduct a trend display with an appropriate resolution power by enhancing an accuracy of displaying trend data gradually from coarse data to dense data after completing the operations such as scrolling. By this process, it is possible to reduce to read out excessive data and demonstrate efficiency and a high speed of the processes.

(1-3) Operation of Trend Display by Transferring Data Through Network

In case that trend data are displayed by the trend displaying device 24 at a remote location utilizing a network as illustrated in a system structure of FIG. 5, it is necessary to transfer time series data through a network. Also, an efficient transfer of data is indispensable for demonstrating a high speed of a process of displaying. In the trend display utilizing the network, provided that the process of reading out data, for example in the above (1-1), is applied, a request of reading out is given by the trend displaying device 22 in a local network 21 or the trend displaying device 24 at the remote location with respect to time series data stored in the trend data storing and displaying device 14 and data at appropriately dense sampling periods in terms of an accuracy of displaying are transferred through a network. When a transferring speed of the network is low, there is a problem that it takes a time for displaying the trend data.

Therefore, a third example of processing according to the First Embodiment will be described in reference of FIGS. 15 and 16, which is an example of processing to read out data for demonstrating a high speed in displaying data in case that data are transferred utilizing the network. In this example, as illustrated in FIG. 15, when it is requested to display data through the network, a small amount of data (coarse data) at relatively coarse sampling periods are initially read out and transferred to display an outline of trend. Thereafter, data (dense data) at dense sampling periods are gradually read out and transferred to conduct a detailed trend display to an extent necessary for an accuracy of displaying on a screen to thereby enhance an accuracy of displaying. Accordingly, it is possible to diminish the amount of data to be transferred at an initial stage of processing to display; an outline is displayed at a high speed to an extent that a user can recognize the outline of trend; and the amount of data to be transferred can be minimized, for example, even in case that the user operates to scroll in the process of displaying.

Because the user can comprehend the outline of trend at a stage that the first outline display is performed, there is a case that the user conducts an operation such as scrolling at that stage. At this time, although data at a sampling period denser than currently displayed trend data are read out and transferred, these dense data are stopped to transfer and a new portion of coarse data to be displayed is started to transfer.

Figure 16A:
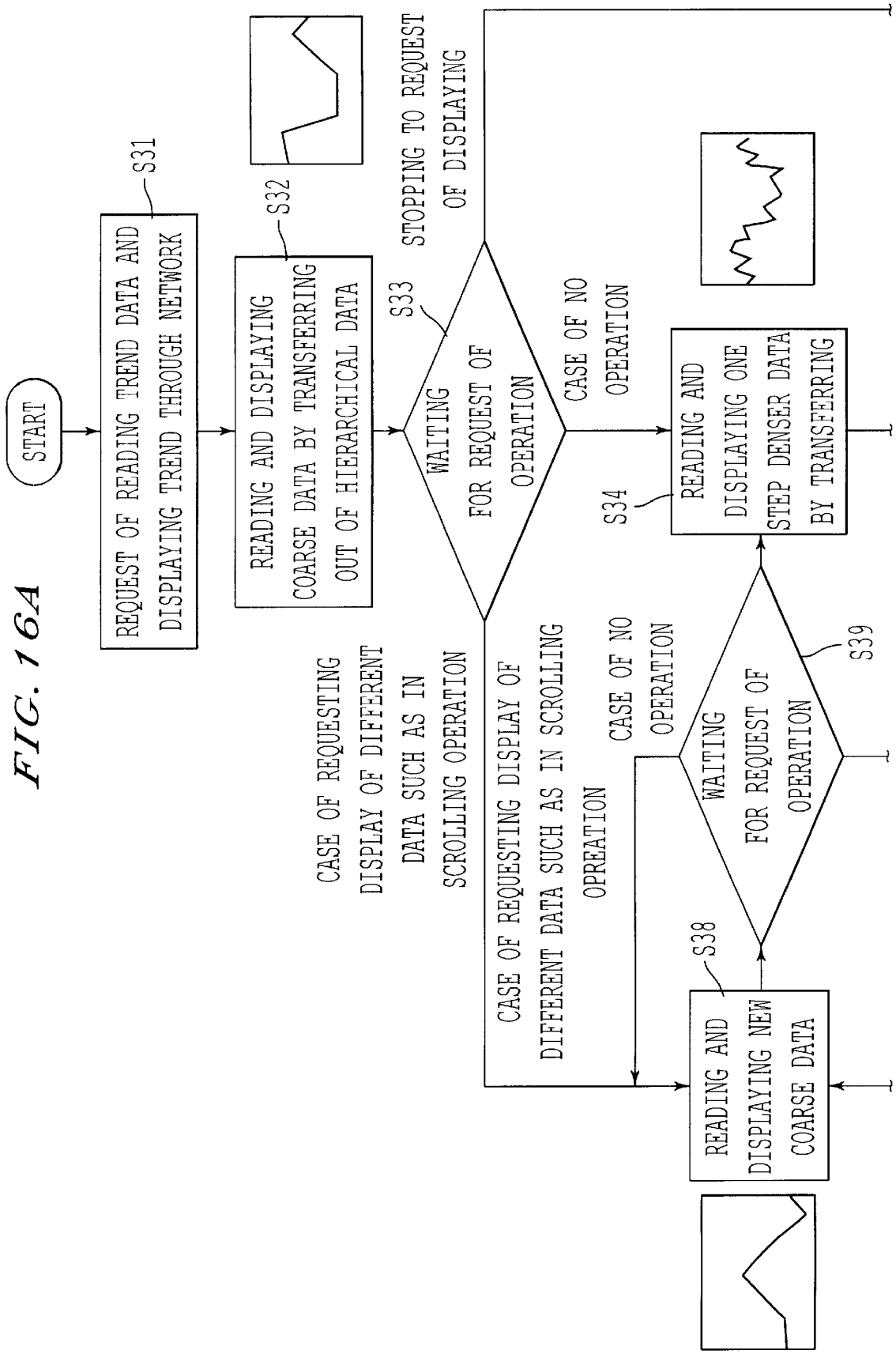
[FIG. 16] A flow chart for illustrating steps of processing to read out and display trend data with respect to a requirement of displaying through a network.

FIG. 16 is a flow chart of steps of processing to read out and displaying trend data in response to the above-mentioned request of displaying through the network. In this, Steps S31 through S39 are substantially similar to Steps S21 through S29 illustrated in FIG. 14 except for the data transfer, wherein in case that it is requested to display trend or different data, for example, in an operation of scrolling, coarse trend data are initially read out and displayed at a high speed by transferring a small amount of coarse data to the trend displaying device through the network, and dense data are gradually transferred to the trend displaying device through the network to read out and display the dense trend data.

Especially in case that the data are transferred through the network, because there are many cases that a speed of transferring data on the network is relatively low, it is possible to obtain a further high speed effect in displaying is obtainable in a network having a slow data transferring speed by utilizing a method for reading trend data and processing to display these as in this example.

When the trend is displayed through the network, it is possible to utilize a small-sized program such as Java (trademark of Sun Microsystems, Inc.), which is usable for general purposes; and the program for displaying trend is transferred to the trend displaying device along with the time series data to display the trend data on an browser application installed in the trend displaying device. In case of such a structure, it is not necessary to provide a display program for exclusive use and a means for displaying in the trend displaying device; it is possible to use a general-purpose computer; and there is no dependency on models of computers, whereby it is possible to easily construct the trend display system. In this case, it is also possible to efficiently transfer the program and the data by diminishing the amount of data to be transferred of the time series data at an initial stage of processing to display as previously described and practically perform the trend display without inconvenience.

As such, by independently storing the time series data at the plurality of sampling periods in the state that the time series data are correlated in use of the method for storing time series data according to this embodiment, it is possible to display on the outline of trend by initially reading out and transferring data at dense sampling periods in case that the trend data are transferred and displayed through a network, whereby an accuracy of displaying is improved. By such a process, because it is possible to decrease the amount of data transferred through the network and transfer only necessary data, it is possible to demonstrate efficiency and a high speed of the process, for example, a high speed process is realized for a trend display on a browser application operable in each trend displaying device.

As described, in the time series data base system utilizing the method for storing time series data according to this embodiment, because it is possible to easily select and read out data at a most suitable sampling period in an arbitrary manner even though a great amount of data are stored, it is possible to reduce an unnecessary process of reading out data upon various requests of reading out data, and a process of reading out data can be performed at a high speed by efficiently reading out of data. Further, because most suitable data can be efficiently read out in accordance with a system structure, it is possible to improve workability and controllability by a user in addition to the high speed of the process.

[Second Embodiment]

Figure 18:
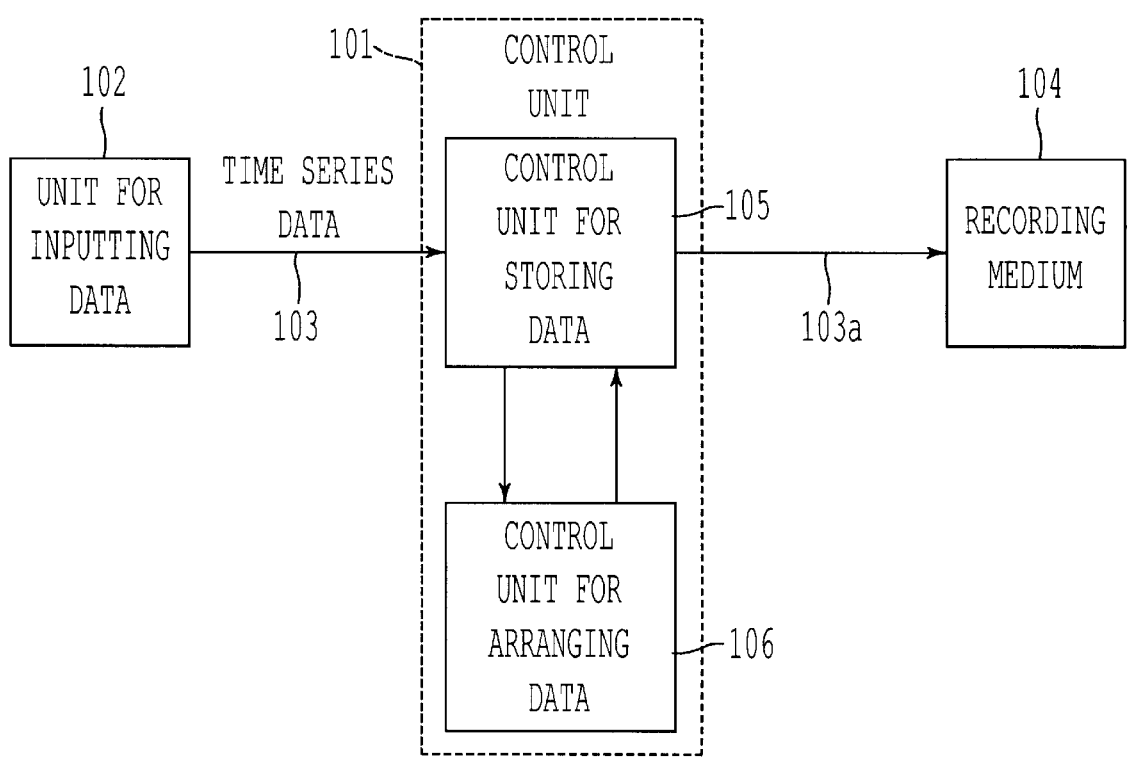
[FIG. 18] A block chart for illustrating a functional structure of a control unit which arranges and stores time series data according to Second Embodiment.
Figure 19:
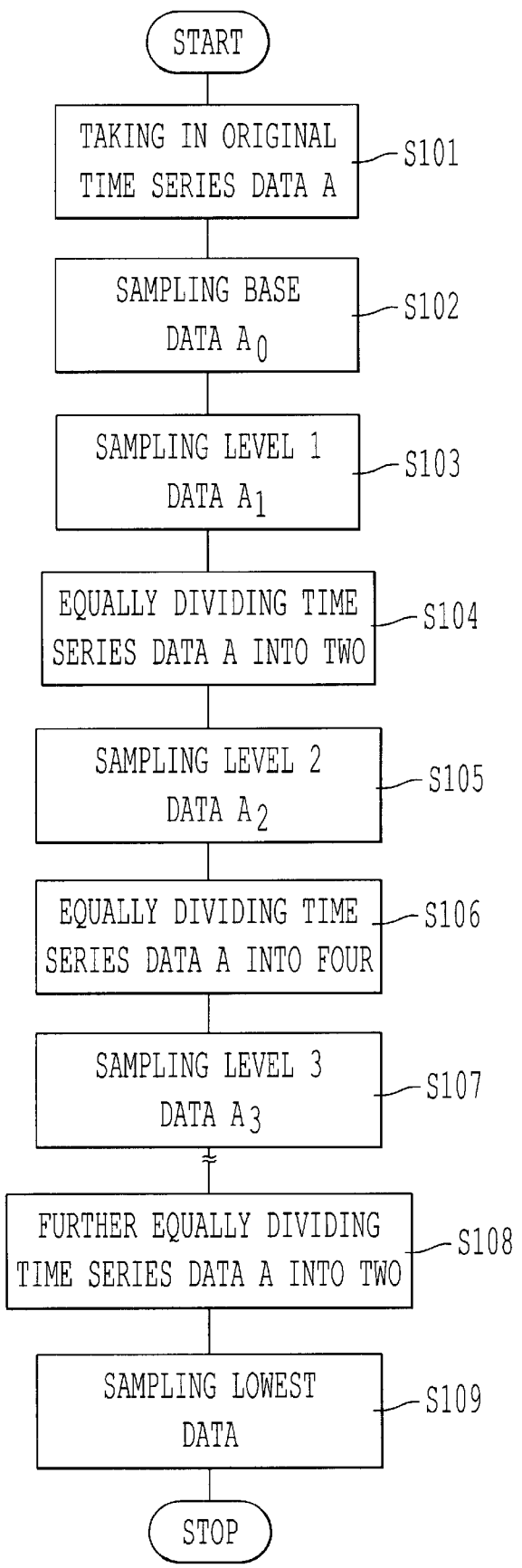
[FIG. 19] A flow chart for illustrating steps of processing at time of storing time series data according to Second Embodiment.
Figure 20:
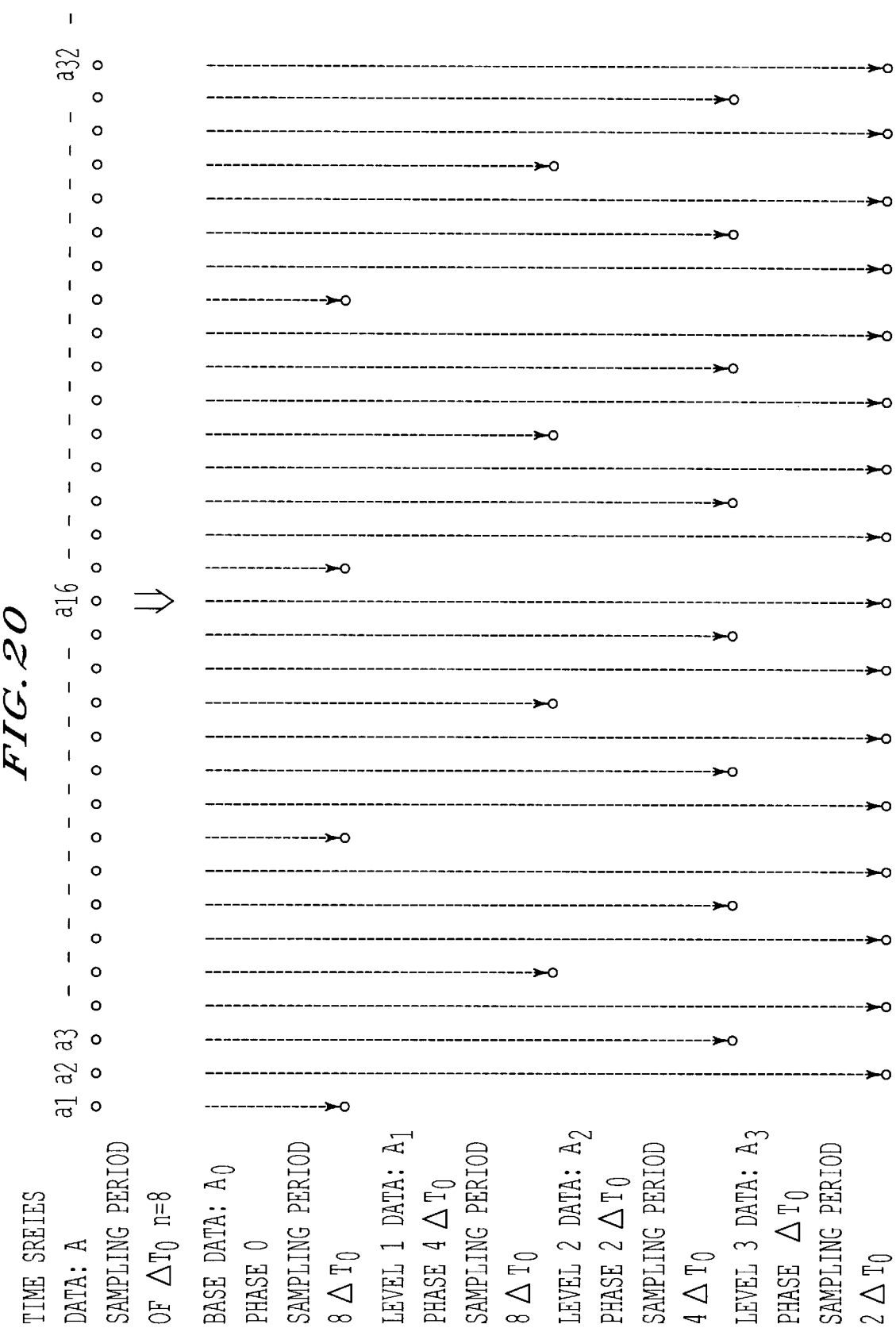
[FIG. 20] An explanatory drawing for illustrating an example of practicing a data arrangement according to Second Embodiment.

In the next, Second Embodiment according to the present invention, namely a method for arranging and storing data at time of hierarchically storing time series data in a method for processing time series data, will be described in reference of FIGS. 17 through 20. FIG. 17 is a drawing for explaining the method for arranging and storing the time series data; FIG. 18 is a block chart for illustrating a functional structure of a control unit for arranging and storing the time series data; FIG. 19 is a flow chart for illustrating steps of processing at time of storing time series data; and FIG. 20 is a drawing for illustrating a practical example of arranging data.

In Second Embodiment, when a great amount of time series data acquired in an industrial plant and so on are stored in a recording medium, the data are minutely divided into a plurality of data groups having different phases and different sampling frequencies as illustrated in FIG. 17 and respectively recorded by a unit of file in a state that these data groups are hierarchically rearranged.

As such, the means for arranging and storing the time series data is functionally constructed by a control unit 101 operated based on various processing programs and formed by a computer and so on, for example, as illustrated in FIG. 18.

The control unit 101 comprises a data storage control unit 105 being a means for controlling to store data which controls a storing process of recording time series data 103 taken in from a data input unit 102 and a control unit for arranging data 106 being a means for controlling to arrange data for controlling to process to arrange data at time of storing the time series data 103.

When the time series data are stored, the time series data 103 inputted in the data storage control unit 105 through the data input unit 102 are minutely divided into a plurality of data groups having different phases and different sampling frequencies and arranged by the data arrangement control unit 106; and thus arranged hierarchical time series data 103a are hierarchically stored in the recording medium 104 by each of the groups. The stored hierarchical time series data are appropriately read out and displayed by a display means such as an outer monitor and transferred to other devices through a network.

In the next, the method for arranging and storing time series data according to this embodiment will be described in detail in reference of FIGS. 17 and 19. In this, a step of processing to store hierarchical data of time series data A (sampling period of $\Delta T0$, the number of data of N) will be exemplified, where the number of data N is $N=2^i$ (i is an integer of 1 or more).

At first, in Step S101, the original time series data A at a sampling period $\Delta T0$ are taken in. In Step S102, as a process corresponding to a procedure of sampling basic data, data at a phase of 0 and a sampling period of $n\Delta T0$ ($n=2^j$, $i \geq j$) are sampled out of the time series data A and stored as base data A0. Succeedingly, in Step S103, as a process corresponding to one of the process of sampling hierarchical data, data at a phase of $n/2 \times \Delta T0$ and a sampling period of $n\Delta T0$ are sampled out of the time series data A and stored as level 1 data A1 being first hierarchical data.

In the next, in Step S104, the time series data A (a total length of $N\Delta T0$) are cut into two halves to have a length of $N/2 \times \Delta T0$. Thereafter, in Step S105, data at a phase of $n/4 \times \Delta T0$ and a sampling period of $n/2 \times \Delta T0$ are sampled out of data in each block divided in Step S104 as level 2 data A2 being second hierarchical data and these two data are respectively stored. Further, in Step S106, the time series data A are cut into quarters having a length of $N/4 \times \Delta T0$. In Step S107, data at a phase of $n/8 \times \Delta T0$ and a sampling period $n/4 \times \Delta T0$ are sampled out of each of thus divided blocks in Step S106 as level 3 data A3 being third hierarchical data and these four data are respectively stored.

Hereinbelow, in Step S108, similar processes to those in Steps S106 and S107 are repeated, and the time series data A are further divided until these become data in a lowest layer of which phase difference and sampling period are minutest with respect to time series data A. In Step S109, the lowest data at a phase $\Delta T0$ and a sampling period $2 \times \Delta T0$ are sampled out of data in each of the divided blocks and respectively stored.

In other words, level m data being the mth hierarchical data (m is an integer of 1 or more) are data at a phase $n/2^m \times \Delta T0$ and a sampling period $n/2^{m-1} \times \Delta T0$ and divided into blocks as much as $2^{m-1}$ and stored. This operation of sampling and storing is repeated and executed until $n/2^m = 1$ is established, whereby hierarchical time series data are formed.

The above data in each hierarchy are respectively stored as a file which can be processed by a computer and so on. Although as a hierarchy is lower, a sampling period of data is shortened, since the original data are divided into blocks stage by stage and sampled, the amount of data of file in a single block is substantially the same in the base data A0 through the lowest data. Incidentally, in case that the number of data N is sequentially increased as in a system of taking in the time series data through an online, a method for setting N to be a substantially large value, minutely dividing the time series data into data in respective hierarchies (A0, A1, A2, . . . ) and arranging, and hierarchically storing the time series data in accordance with respective phases and respective sampling periods and so on may be used.

FIG. 20 more concretely shows a data arrangement in each hierarchy in the above-mentioned method for arranging and storing data according to this embodiment. In this, a case that the time series data A (a1, a2, a3, a32, . . . ) of the sampling period $\Delta T0$ are hierarchically stored as n=8 will be exemplified. The base data A0 are data at a phase of 0 and a sampling period of $8\Delta T0$, which are obtained by sampling eight each of the time series data A starting from the data a1 based on a predetermined standard time (a time of the heading data al having a phase of 0).

The level 1 data A1 are data at a phase of $4\Delta T0$ and a sampling period of $8\Delta T0$, of which phase is deviated by a half of the sampling period of the base data A0 and sampling period is similar to that of the base data A0. Accordingly, time series data A are made by sampling every eight out of the data a5 at a phase deviated by $4\Delta T0$ from the above standard time. The level 2 data A2 are data at a phase of $2\Delta T0$ and a sampling period of $4\Delta T0$, of which phase is deviated by a quarter of the sampling period of the base data A0 and sampling period is a half of that of the base data A0. Accordingly, time series data A are made by sampling every four out of the data a3 at a phase deviated by $2\Delta T0$ from the above standard time. The level 3 data A3 are data at a phase of $\Delta T0$ and a sampling period of $2\Delta T0$, of which phase is deviated by an octant of the sampling period of the base data A0 and sampling period is a quarter of that of the base data A0. Accordingly, time series data A are made by sampling every two out of the data a2 deviated by a phase of $\Delta T0$ from the above standard time.

Accordingly, in case of n=8, the level 3 data become lowest data, the original time series data A are totally sampled by forming the lowest data, and a plurality of blocks of data are hierarchically rearranged. As illustrated in FIG. 20, thus rearranged and stored data have a data structure of so-called binary tree type. The total amount of data of the time series data having the hierarchical structure according to this embodiment is the same as that of the original serial time series data.

In the above method for storing data according to First Embodiment, since time series data at a sampling period longer than $\Delta T0$ are correlated and stored in addition to time series data at a sampling period $\Delta T0$, thus stored time series data are overlapped and there may be a case that the amount of data becomes larger than the original time series data. Further, there is a case that control information is added for correlating data at various sampling periods.

On the other hand, according to the method for arranging and storing data according to Second Embodiment, because data are not overlapped in case of hierarchically storing time series data at a plurality of sampling periods, the amount of data to be stored is minimized and the data can be stored in a recording medium with efficiency in terms of capacity. Further, locations of data in an aimed hierarchy of data to be accessed and respective hierarchies are uniquely determined based on information such as a phase and a sampling period, whereby it is possible to obtain the locations by a simple arithmetic operation (shift operation of binary number), and it is not necessary to provide a table recording correlated information between hierarchies and so on.

Figure 21:
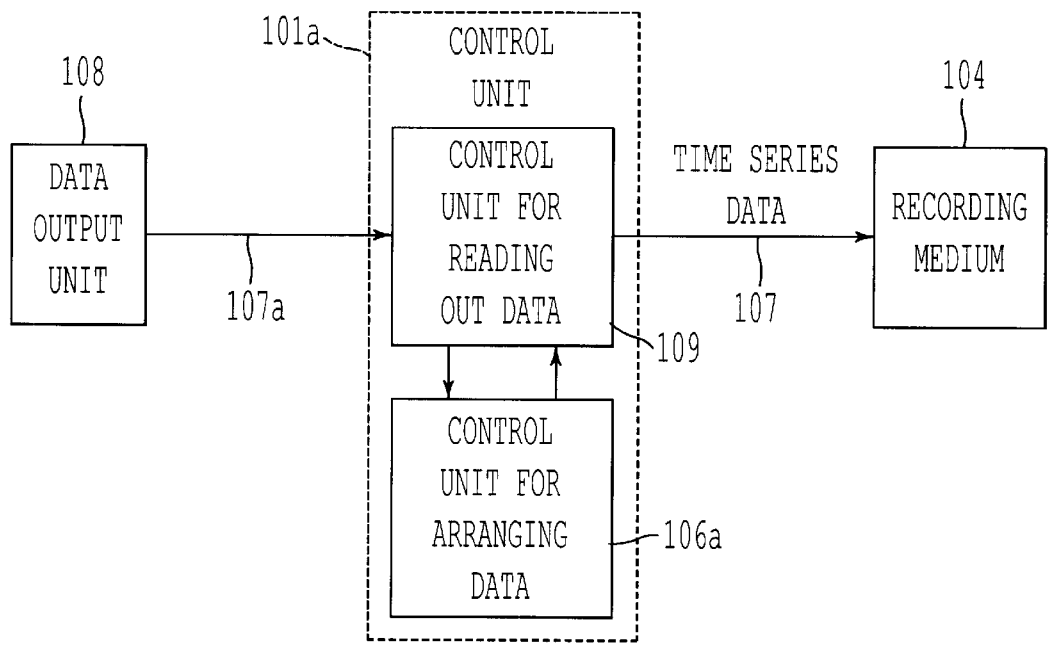
[FIG. 21] A block chart for illustrating a functional structure of a controlling unit for arranging and reading out time series data according to Second Embodiment.
Figure 22:
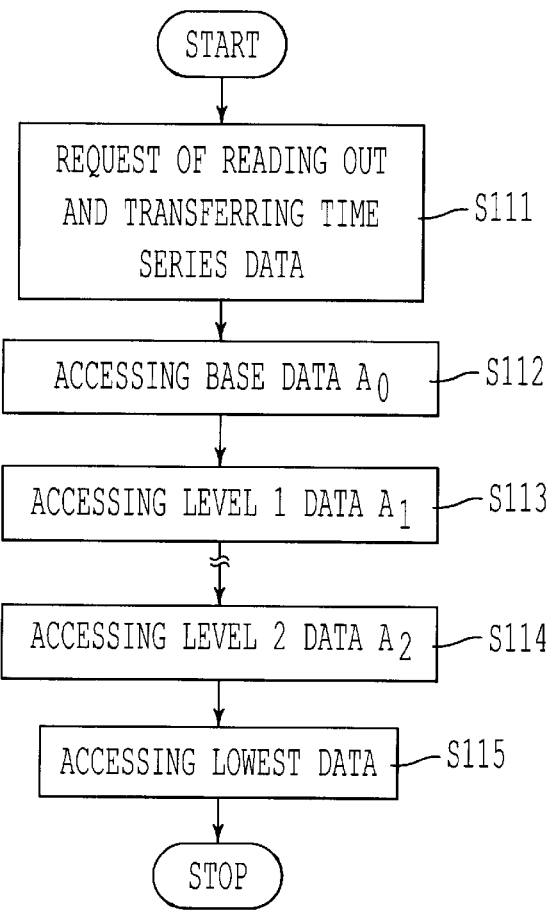
[FIG. 22] A flow chart for illustrating steps of processing at time of reading out time series data according to Second Embodiment.

In the next a method for reading out data at time of displaying and transferring time series data will be described. FIG. 21 is a block chart for illustrating a functional structure of a control unit for arranging and reading out time series data; and FIG. 22 is a flow chart for showing steps of processing at time of reading out the time series data.

In case that the hierarchical time series data hierarchically arranged and stored as illustrated in FIG. 17 are read out, it is possible to obtain coarse data and gradually dense data by sequentially reading out data in respective hierarchies out of base data. On the other hand, in case of reading out serially stored time series data, for example, as illustrated in FIG. 40 or 41, a similar effect thereto is obtainable by conducting the above process of arranging data at time of reading out data and succeedingly outputting.

Thus a means for arranging and reading out time series data is for example functionality constructed by the control unit 101a operated based on various processing programs and realized by a computer and so on as illustrated in FIG. 21. The control unit 101a comprises a data read out control unit 109 constituting a means for controlling to access data controlling to read out data, which reads out time series data 107 stored in the recording medium 104 and outputs through the data output unit 108, and the data arrangement control unit 106a constituting a means for controlling to arrange data, which controls a process of arranging data at time of reading out the time series data 107.

In case that the hierarchical time series data as in FIG. 17 are read at time of reading out time series data, a process corresponding to steps of accessing data is to sequentially read out data in respective hierarchies from the base data A0 to the lowest data by the data read out control unit 109 out of the recording medium 104 and to display by outputting to a display device such as an outer monitor through the data output unit 108 or transfer to other devices connected to a network. Meanwhile, in case that serially stored time series data are read out, a process corresponding to steps of arranging data is to minutely divide a plurality of groups of data respectively at different phases and different sampling periods by the data arrangement controlling unit 106a, and to temporarily store in a memory or the like in a state that respective groups of data are hierarchically arranged. Thereafter, a process corresponding to steps of accessing data is to sequentially read out the hierarchical time series data 107a subjected to the process of arranging out of the base data A0 by the data read out control unit 109 and to output through the data output unit 108.

A method for accessing data concerning reading out and transferring the time series data having such a hierarchical structure will be described in detail in reference of FIG. 22.

In Step S111, a request of reading out and/or transferring time series data is received. In Step S112, the base data A0 in the hierarchical time series data are initially accessed to read out the base data A0, outputted to a display device or the like, and transferred these to a network. In Step S113, the level 1 data A1 in the above time series data are accessed to read out the level 1 data A1. Thereafter, in Step S114, the level 2 data A2 in the above time series data are accessed to read out the level in data A2. In Step S115, a process of accessing lower data is repeated to finally access lowest data to read out.

By these procedures, in case of reading out the time series data, it is possible to sequentially access and store from coarse data gradually to dense data so as to interpolate, whereby there is no need to conduct useless processes such that unnecessary data are read out for obtaining data having a requisite desirable accuracy and same data are repeatedly read out. Accordingly, in the method for accessing data according to this embodiment, even in case that data concerning a great amount of time series data are displayed and transferred, it is possible to minimize the amount of data to be treated and demonstrate efficiency and a high speed of process and effective utilization of resources.

Further, as a modified example of a method for accessing data concerning reading out and transferring time series data having a hierarchical structure, it is possible to once access, read out, and transfer base data constituting time series data at a predetermined sampling period and data at a predetermined hierarchy in response to a request of reading out and transferring time series data. In this case, it is possible to display and transfer data at a predetermined most suitable sampling period by easily acquiring the data at a high speed upon the request.

Further, a file of time series data divided into blocks in each hierarchy can be treated in a state that data are compressed using, for example, a known method for compressing differences when a storage, a transfer, and so on are conducted. By this, it is possible to save a capacity of a recording medium, a memory, and attain a further high speed in transferring data. By making blocks of respective time series data small-sized files having substantially the same sizes, for example, of about 50 k bytes, it is possible to minimize a time for the differential compressing process. Further, because data can be transferred by treating a unit of file a single packet, it is possible to easily and efficiently execute a process of transferring data.

In the next, an applicable example, in which a system of processing time series data utilizing the hierarchical time series data arrangement and the method for accessing the hierarchical time series data according to Second Embodiment is applied to the trend displaying system illustrated in FIGS. 4 and 5, will be described. In this, an example of a process of reading out time series data according to the trend displaying system of this applicable example will be described.

(2-1) Operation of Displaying Trend by Data Transfer Through Network

In a system structure illustrated in FIG. 5, when hierarchically stored time series data illustrated in FIG. 17 are displayed as trend data by the trend displaying device 24 at a remote location utilizing a network, it is indispensable to transfer the time series data through the network. At this time, for demonstrating a high speed of a process of displaying, it is indispensable to transfer the data with efficiency.

Therefore, a first example of processing according to the Second Embodiment will be described with reference to FIGS. 23A–23C, which are examples of processes of transferring and displaying the data at the time of performing an operation of displaying trend through the network.

Figure 23A:
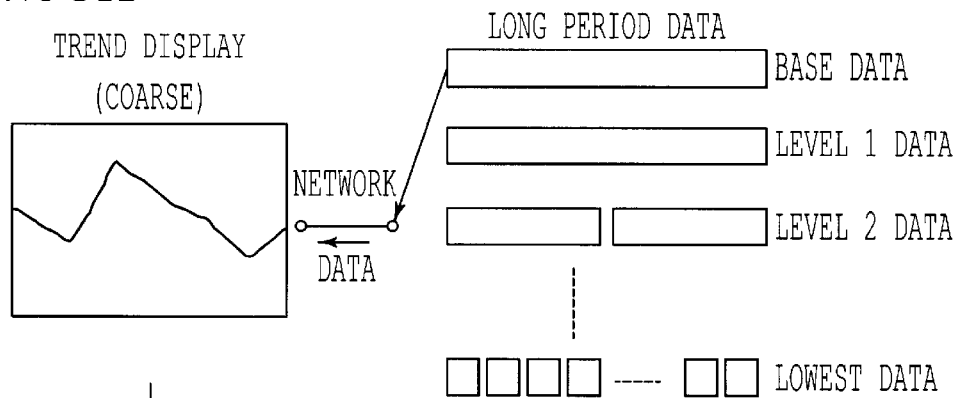
[FIGS. 23A–23C] Explanatory drawings for showing an example of processes of transferring and displaying data in case that a trend display is operated through a network.
Figure 23B:
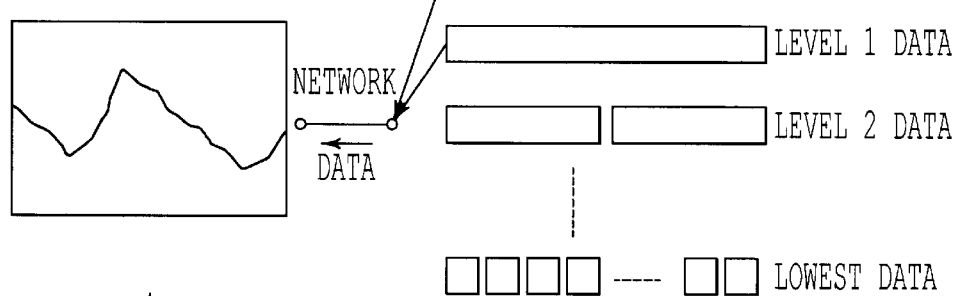
Figure 23C:
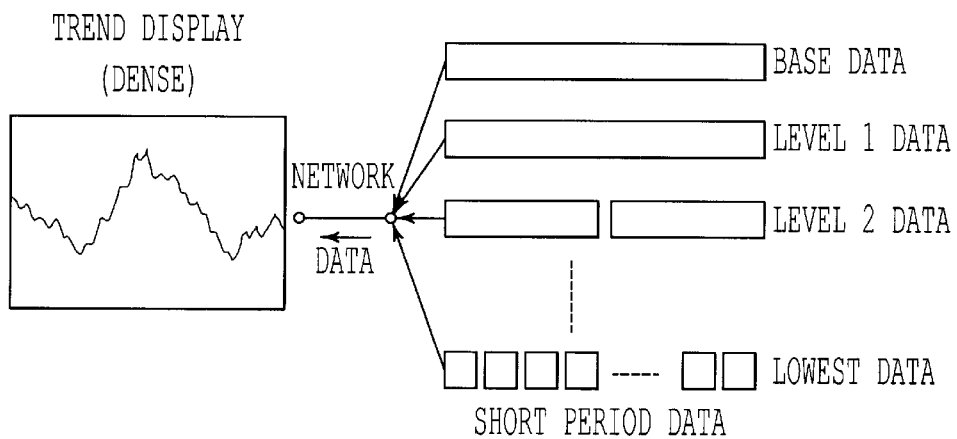

When it is requested to display data through a network, at first as in FIG. 23A, base data are read out and transferred; and succeedingly, as in FIG. 23B, level 1 data are read out and transferred. As such, data at a relatively coarse sampling period in an upper hierarchy (long period data) are initially read out and transferred to display an outline of trend. Thereafter, data at dense sampling periods in lower hierarchies (short period data) are sequentially read out and transferred to perform detailed trend displays. Finally, as in FIG. 23C, the lowest data are read out and transferred.

In use of such processes, it is possible to realize a dense trend display by gradually interpolating intervals between data from a coarse trend display and to enhance an accuracy of displaying to an extent necessary for an accuracy of displaying in a screen. At this time, because the file sizes of data in respective hierarchies to be sequentially transferred are substantially the same, it is possible to save a time for transferring respective data.

In addition, it is also possible to read out and transfer data after once accessing base data and data in a predetermined hierarchy fabricating time series data at a predetermined sampling period corresponding to a request of displaying the time series data through the network. In this case, it is possible to easily transfer and display data at a predetermined most suitable sampling period at a high speed in response to the request.

(2-2) Operation of Displaying Trend at Time of Scrolling Screen

A second example of processing according to the Second Embodiment, which is an example of processes of transferring and displaying data at the time of scrolling, will be described in reference of FIGS. 24A–24C and 25.

When an operation of scrolling is conducted, data corresponding to a portion to be newly displayed must be sequentially read out. However, it is not always necessary to accurately display trend data on a screen. It is sufficient to display to an extent that an outline of trend is recognized by data at a coarse sampling period in the operation of scrolling.

Figure 24A:
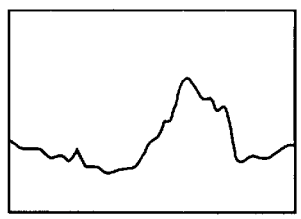
[FIGS. 24A–24C] Explanatory drawings for showing an example of a process of displaying data at a time of performing a scrolling operation.
Figure 24B:
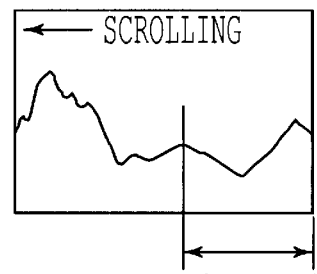
Figure 24C:
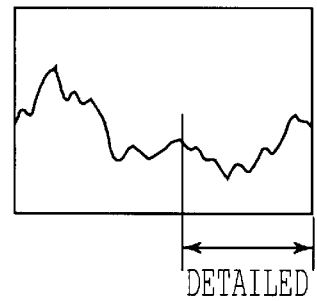

In consideration of such a circumstance, in the operation of scrolling under a state of displaying a detailed trend, as illustrated in FIG. 24A, data in an upper hierarchy at a relatively coarse sampling period (coarse data) are used to display, which data are initially read out and completed to be transferred as illustrated in FIG. 24B, and the data are displayed to an extent that the outline of the trend is recognized. After scrolling, as illustrated in 24C, a detailed display is conducted by reading out data at a dense sampling period (dense data) down to a lower hierarchy to an extent necessary for an accuracy in displaying on a screen.

Figure 25:
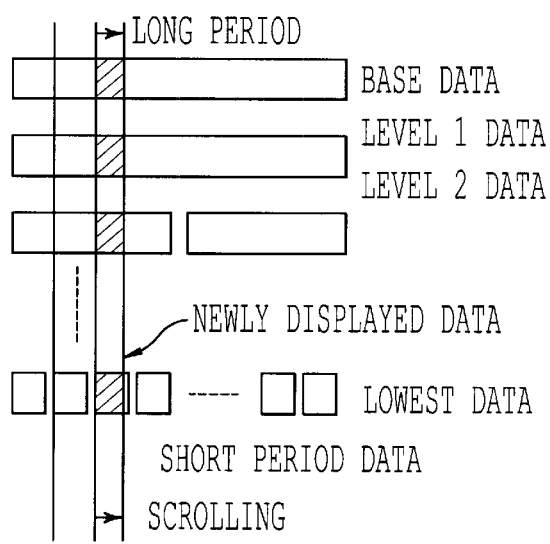
[FIG. 25] An explanatory drawing for illustrating an example of a process of transferring data at a time of performing a scrolling operation.

Accordingly, as illustrated in FIG. 25, at time of scrolling, data continued in a manner of sampling times with respect to the data read out and displayed before scrolling (hatched portion in the figure) are sequentially read out of an upper base data and transferred to display, whereby the amount of data required to be newly transferred by the operation of scrolling can be small.

As described, by previously dividing time series data into data at a plurality of sampling periods and storing by hierarchically arranging these, it is possible to sequentially select and read out data in a most suitable hierarchy of sampling period upon various requests of reading out data. Therefore, it is possible to reduce a useless process of reading out data and operate to process data at a high speed. Further, maneuverability, for example, in displaying data is improved.

The great amount of time series data generally measured and utilized in an industrial plant or the like are stored as a data base in a data server and so on in a network. In case that such time series data are serially stored by a method for storing as illustrated in FIG. 40, a great amount of memories are used at time of processing data and an accessing speed to the data is lowered. On the other hand, although a method for storing time series data by minutely dividing the data into files of small sizes can be applied as illustrated in FIG. 41, there is inconvenience in terms of a display of trend data for a long period and so on.

On the contrary, by utilizing the method for arranging and storing hierarchical data as described in this embodiment, it is possible to regularly divide a great amount of time series data into data of small sizes in accordance with a manner of binary tree and store these. In this case, data are thinned out at an appropriate length of sampling period in all hierarchies, and respective blocks are stored as files, in which the number of blocks of data to be divided is increased for lower hierarchies having shorter sampling periods, whereby the sizes of files of all blocks become substantially the same. When these files are subjected to a compressing process such as a differential compression method, it is possible to save memories of a computer such as a data server. Further, this hierarchical data structure can meet various requests of reading out data as described. Further, it is also possible to save the capacity of recording medium because the hierarchical data structure can be constructed without increasing the amount of data in comparison with the original time series data.

Further, in use of thus arranged and stored hierarchical data structure as described in this embodiment, it is possible to easily obtain data at a desirable sampling period by initially accessing coarse data and gradually dense data interpolating intervals and storing the read out data in case such that the time series data are read out, transferred, and displayed. Accordingly, an access time for processing, for example, to read out and transfer data for acquiring data at a desirable sampling period can be shortened.

Especially in case that an access is through a network connecting remote locations, namely time series data are transferred and displayed using a relatively slow transmission path, it is possible to increase a speed of transferring data, whereby a transfer and a display of data at a high speed with efficiency are possible. In this case, because a user can comprehend an outline of trend immediately only by a display of coarse data and, when necessary, confirm details of the trend by displaying dense data, it is possible to reduce a stress in waiting for a display. Further, in case that an operation of scrolling a display screen, it is possible to efficiently process to read out and transfer data corresponding to a portion to be newly displayed at a high speed.

Further, according to the method for arranging and storing hierarchical data according to this embodiment, because data at a relatively coarse sampling period in an upper hierarchy (data in a long term scale) through data at a relatively dense sampling period in a lower hierarchy (data in a short term scale) are covered, it is possible to meet an operation of displaying trend in an arbitrary time scale. At this time, data at a desirable time in a desirable hierarchy can be easily searched by a simple mathematical operation and sampled at a high speed.

[Third Embodiment]

In the next, a system structure of dispersely storing data of a plurality of groups and arbitrary reading out desirable data to display for monitoring the stored data in a system of displaying time series data will be described.

In this, an example of constructing a plant data monitoring system which monitors trend data in an industrial plant such as a glass tank will be described as a system of displaying time series data. In this case, raw data measured in the industrial plant as time series data are used. However, it is not limited to these and data subjected to any kind of processes, i.e. data for operation such as an average value of raw data and simulation data, may be used. Further, as in the above embodiment, any time series data such as data concerning transitions of stock value and commodity prices may be used.

Figure 26:
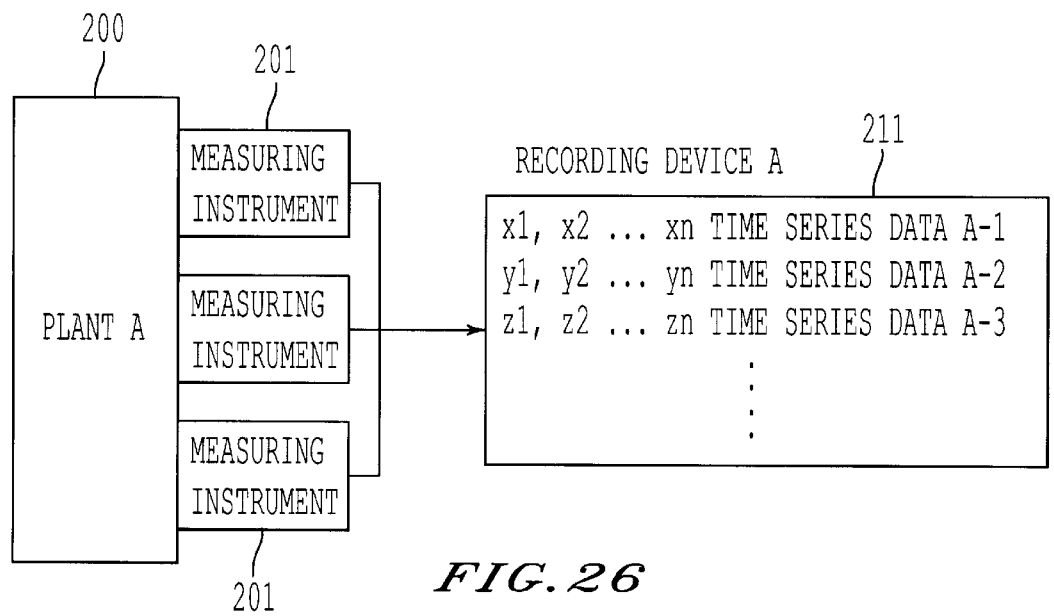
[FIG. 26] An explanatory drawing for illustrating an example of structure of data recording unit of a plant of a system of monitoring plant data according to Third Embodiment of the present invention.

A data recording unit, which records time series data in a plant, will be described in reference of FIG. 26. FIG. 26 is a drawing for explaining an example of constructing the portion of recording data in the plant. In an example of this figure, an arbitrary plant A is illustrated. In a plant A200 of a system of monitoring plant data, a measuring instrument 201 for detecting values representing various operational conditions and so on such as temperatures and flow rates of various portions in the plant A200 and a recording device A211 including a recording medium for recording time series data of measured values obtained by the measuring instrument 201 are provided.

A plurality of groups of time series data respectively measured by measuring instruments 201 in the plant A200 are continuously recorded and stored in a recording medium A211 in a respective manner. In the recording device A211, respective groups of time series data continuously acquired are sequentially recorded such that time series data A-1 (x1, x2, . . . , xn), time series data A-2 (y1, y2, . . . , yn), time series data A-3 (z1, z2, . . . , zn) . . . Such time series data are recorded in the recording medium as a file along with tag information for identifying the groups of data and data information for indicating a time of acquiring the data. As the recording medium, it is possible to use various mediums such as a magnetic disk such as a hard disk, an optomagnetic disk, an optical disk, and a magnetic tape.

A method for storing time series data may be a method for serially storing data illustrated in FIG. 40 or 41 or a method for hierarchically storing data illustrated in FIG. 1 or 17, wherein it is possible to deal with various requests of reading out data and demonstrate further efficiency and a further high speed in processing to read out data. The time series data can be stored in a state that data are compressed using a known differential compression method. In any method, it is sufficient that a data base having an efficient mode is designed in respective plants to store the time series data.

Figure 27:
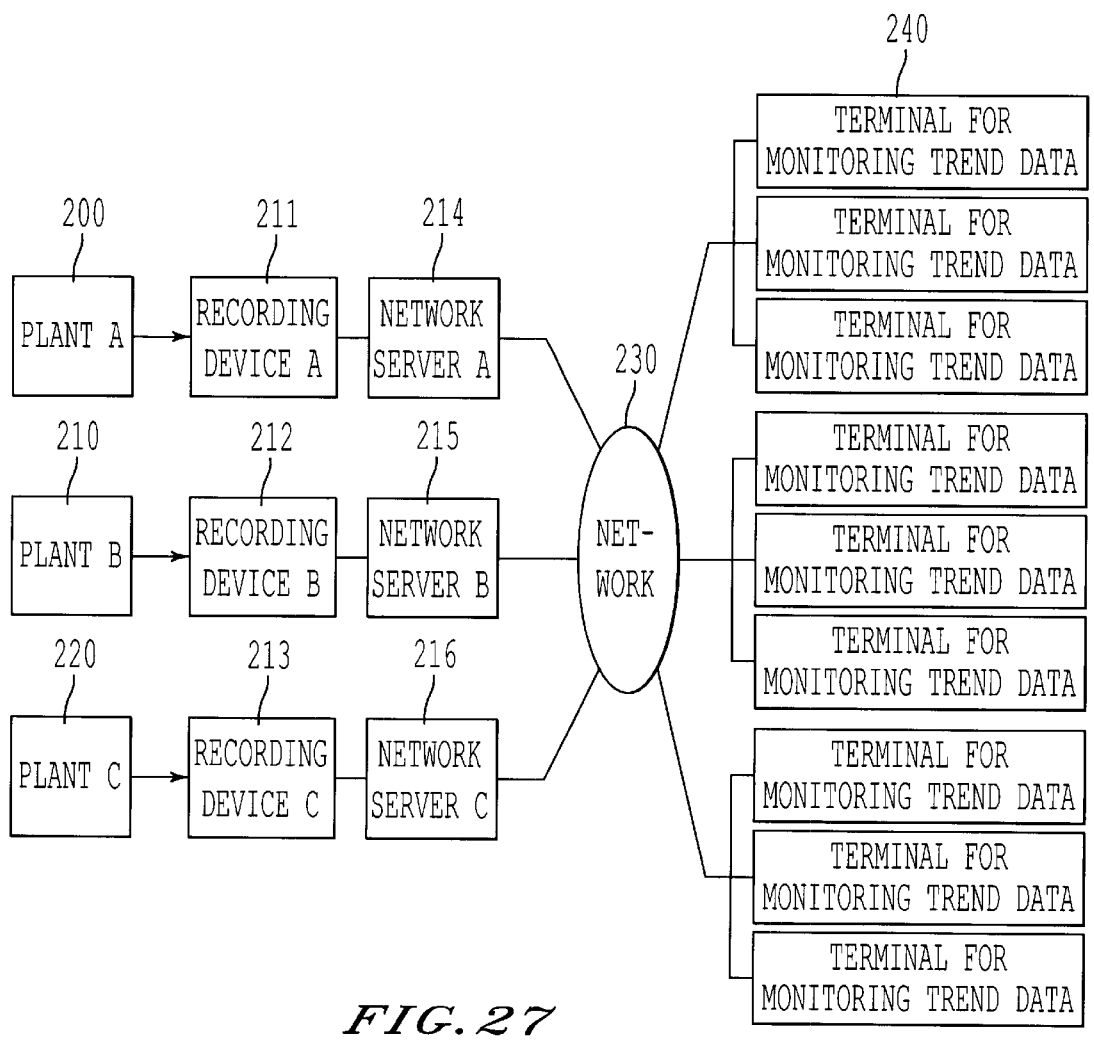
[FIG. 27] A block chart for illustrating an entire structure of a plant data monitoring system according to Third Embodiment.

In the next, an example of structure of a system for monitoring plant data for a case that a plurality of the plants as described exist and trend data concerning the plurality of the plants are monitored will be described. FIG. 27 is a block chart for illustrating a whole structure of the system for monitoring plant data. This system of monitoring plant data has a structure that a plurality of plants A200, B210, and C220 dispersely located in a plurality of locations (in this, case that the number of plants is three is exemplified) are connected through a network.

Respectively in the plants 200, 210, and 220, a recording device A211, a recording device B212, and a recording device C213 are provided, which are respectively connected to a network server A214, a network server B215, and a network server C216, respectively constituting a method for controlling to read out data. These network servers 214, 215, and 216 are connected to a local area network (LAN) through an Ethernet or the like, a wide area network (WAN) utilizing a public circuit or a personal circuit, or a network 230 such as an internet. In other words, the plurality of groups of time series data grouped respectively in each of the plants are fabricated to be dispersely stored in respective recording devices in the plants. Although the network servers 214, 215, and 216 are respectively provided in the plants and in a one-to-one correspondence respectively to the recording devices 211, 212, and 213, the plurality of recording mediums are grouped into blocks in accordance with a system structure and a single network server is provided for each of the blocks.

Further, to the network 230, a single or a plurality of terminals for monitoring trend data (hereinbelow, appropriately abbreviated as terminal) 240, corresponding to a means of displaying, which reads desirable time series data stored in the recording devices 211, 212, and 213 and displays these as trend data, are connected.

In such a system of monitoring plant data, time series data respectively of the plants 200, 210, and 220 are dispersely stored in the recording devices 211, 212, and 213. Further, in correspondence with a request of reading out data from the terminal for monitoring trend data 240 having a function of a means for designating data, corresponding data are read out and transferred by the network server 214, 215, and 216 having a function of a means for transferring data, respectively connected to the recording devices 211, 212, and 213, to make it possible to display in the terminal for monitoring trend data 240. Thus, data base, in which time series data in the plurality of plants are dispersely stored in respective recording devices, is constructed.

Figure 28:
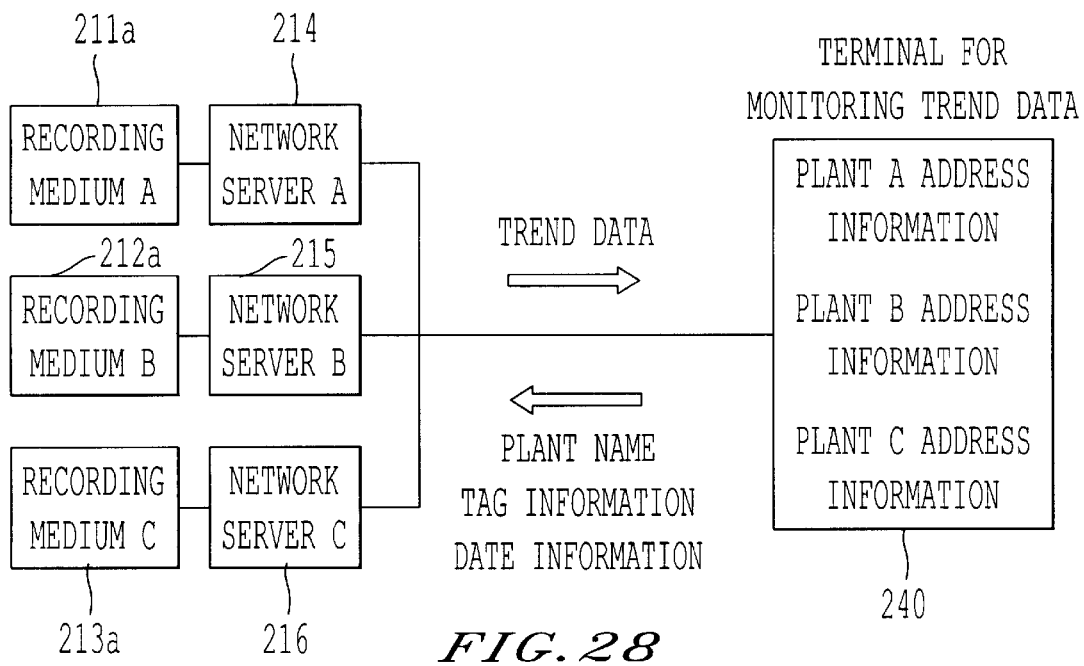
[FIG. 28] An explanatory drawing of operation for illustrating exchanges of information concerning reading out of trend data in Third Embodiment.
Figure 29:
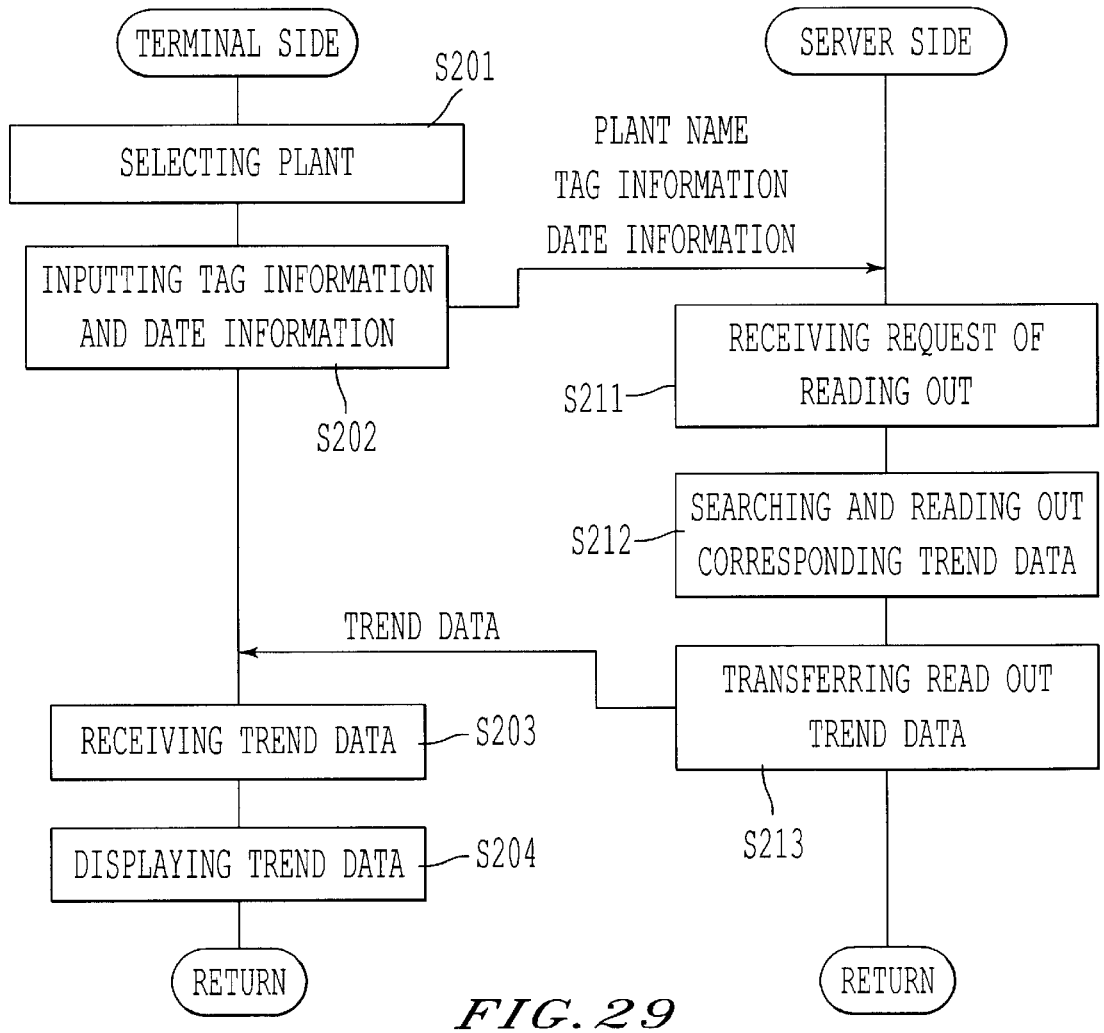
[FIG. 29] A flow chart for illustrating steps of processing to read out trend data according to Third Embodiment.

In the next, a process of reading time series data out of the data base and displaying trend in the system of monitoring plant data will be described in reference of FIGS. 28 and 29. FIG. 28 is an explanatory chart for illustrating exchanges of information concerning reading out of trend data; and FIG. 29 is a flow chart for illustrating steps of processing to read out trend data.

In the terminal for monitoring trend data 240, address information (network address) of a device storing data in each plant is registered and held. In case of such a system structure, because the terminal for monitoring trend data 240 requests the network servers 214, 215, and 216 to read out, it is sufficient that the terminal at least has address information of the network servers 214, 215, and 216 of the plants.

A user requests to read out of an arbitrary item of trend data in an arbitrary plant among the registered plants in the terminal for monitoring trend data 240 and views the read out trend data in a graph display. At this time, an aimed plant, tag information for identifying trend data, and date information such as a term to be read out are inputted in the terminal for monitoring trend data 240. Such tag information is data for identifying, for example, a position in a plant where data are acquired and a type of the physical amount of the data. A series of time series data are sequentially stored in a recording medium in correspondence with a piece of tag information. To know which tag information exists in which plant, a list of the tag information is previously prepared in a side of the terminal, or a list of the tag information is transferred from the network server of the corresponding plant to the terminal when the plant is selected. Because it is sufficient that at least address information of respective network servers and tag information of time series data in respective plants are owned by the terminal for monitoring trend data 240, the capacity of memorizing information at a side of the terminal can be small and the terminal can be simply constituted at a low cost.

An inputted plant name, and inputted tag information and date information are transferred to the network server in the corresponding plant based on the above address information from the terminal for monitoring trend data 240. In the network servers 214, 215, and 216, time series data at a predetermined period corresponding to the received tag information and date information are searched and read out by the recording mediums 211*a*, 212*a*, and 213*a* and transferred to the terminal for monitoring trend data 240 as trend data. At this time, the network servers 214, 215, and 216 own the address information of the time series data stored in a unit of file on the recording medium in each plant (network address, interface ID, directory, file name, and so on of recording medium), whereby time series data corresponding to the tag information and the date information can be immediately read out.

This process of reading out trend data will be described in detail with reference to FIG. 29. In Step S201, a plant from which it is required to read out is selected on the side of the terminal for monitoring trend data 240. In Step S202, tag information of the required trend data in the plant and the date information of designating these term are inputted.

Figure 30:
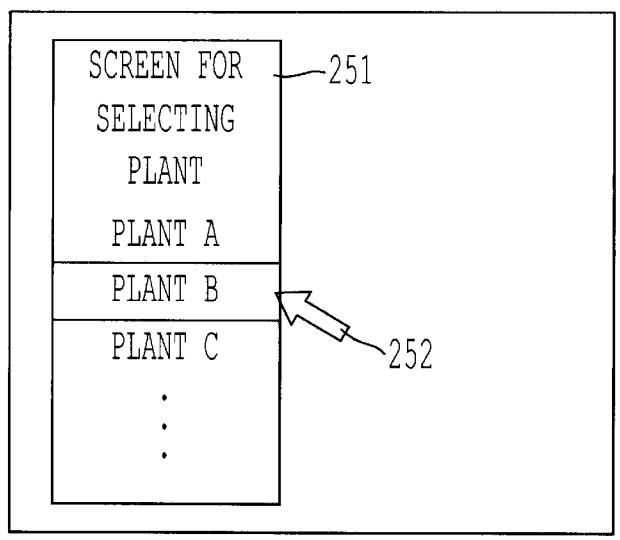
[FIG. 30] An explanatory drawing for illustrating an example of a user interface at time of selecting a plant.
Figure 31A:
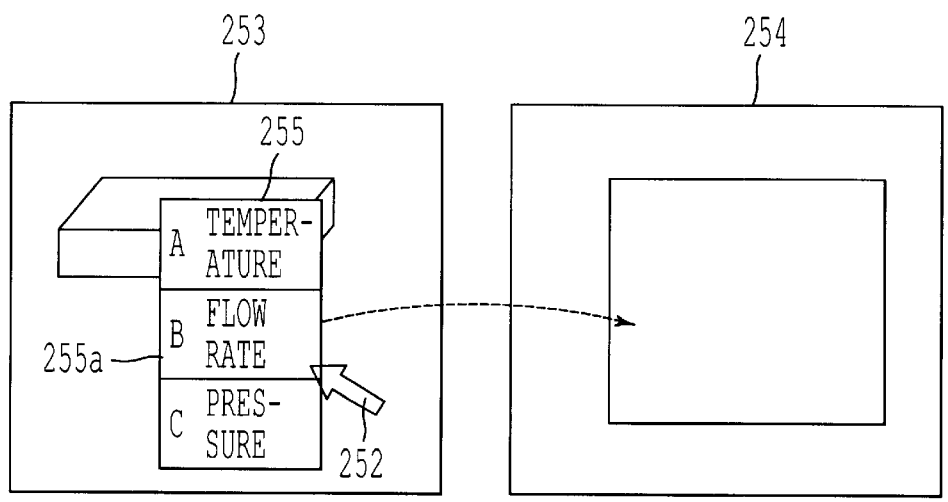
[FIGS. 31A and 31B] Explanatory drawings for illustrating an example of user interface at time of selectively inputting tag information.
Figure 31B:
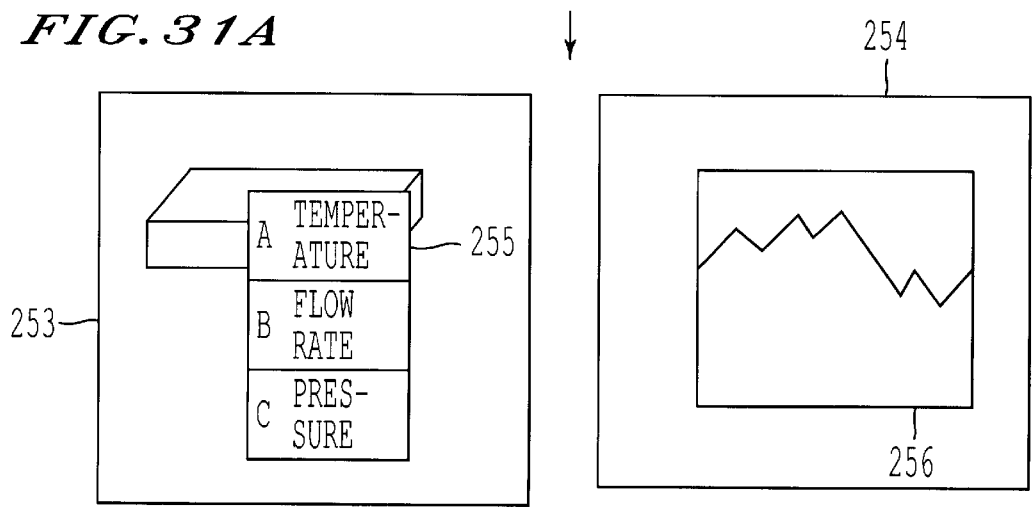

In this, an example of a user interface for selecting a plant and selecting and inputting tag information is illustrated in FIGS. 30, 31A, and 31B. For example, when a plant is selected, a list of selective plants is displayed in a form of a list in a screen for selecting plant 251 on a monitor screen of the terminal for monitoring trend data 240 as illustrated in FIG. 30. When the user designates a desirable plant in the screen for selecting plant 251 by clicking using a mouse or the like, the plant is selected. In this, a case that the plant B210 is selected will be described.

When the tag information is selected, for example, a plant screen 253 for displaying a schematic view of the selected plant and a trend graph screen 254 for displaying the trend data in a graph are prepared as illustrated in FIGS. 31A and 31B. As in FIG. 31A, when the user designates an aimed portion of plant in the plant screen 253 by clicking by a pointer 252, a tag information list 255 showing data items of stored time series data concerning the portion is displayed by popping up. Succeedingly, the user operates to drag and drop by grabbing desirable tag information in the list of tag information 255 by the pointer, and moving and dropping it on the screen of trend graph 254, a trend graph 256 corresponding to the tag information is displayed on the screen of trend graph 254, as shown in FIG. 31B.

The tag information may be selected by double clicking, i.e. clicking twice, after indicating aimed tag information, inputting through a key of a keyboard, or operating for achieving the selection instead of the operation of dragging and dropping. The date information can be set and inputted by inputting numerals or designating by selecting from candidates at time of selecting the tag information. At this time, a preferable predetermined value may be set as an initial value.

Now return to FIG. 29. Information such as the plant name, the tag information, and the date information selected by the terminal for monitoring trend data 240 is transferred to the network server B215 of the corresponding plant B210. In Step S211, the network server B215 receives the plant name, the tag information, and the date information transmitted from the terminal for monitoring trend data 240 as a request of reading out. In Step S212, requested time series data corresponding to the request of reading out are searched out of a plurality of time series data concerning the plant B210 stored in the recording medium B212*a* and read out as trend data. At this time, for example, a series of time series data are densely divided and stored in a unit of file, and a file corresponding to the request of reading out is selected and read out.

Succeedingly, in Step S213, the network server B215 transfers the read out trend data to the terminal for monitoring trend data 240 from which the request for reading out is received. In Step S203, the terminal for monitoring trend data 240 receives trend data transmitted from the network server B215. In Step S204, the trend data are displayed in a monitor screen in a form of a graph or the like.

In the process of reading out the above trend data, a known communication protocol such as File Transfer Protocol (FTP) may be used or a protocol suitable for this system for an exclusive use may be designed and used in transferring the plant name, the tag information, the date information, and the trend data.

Figure 32:
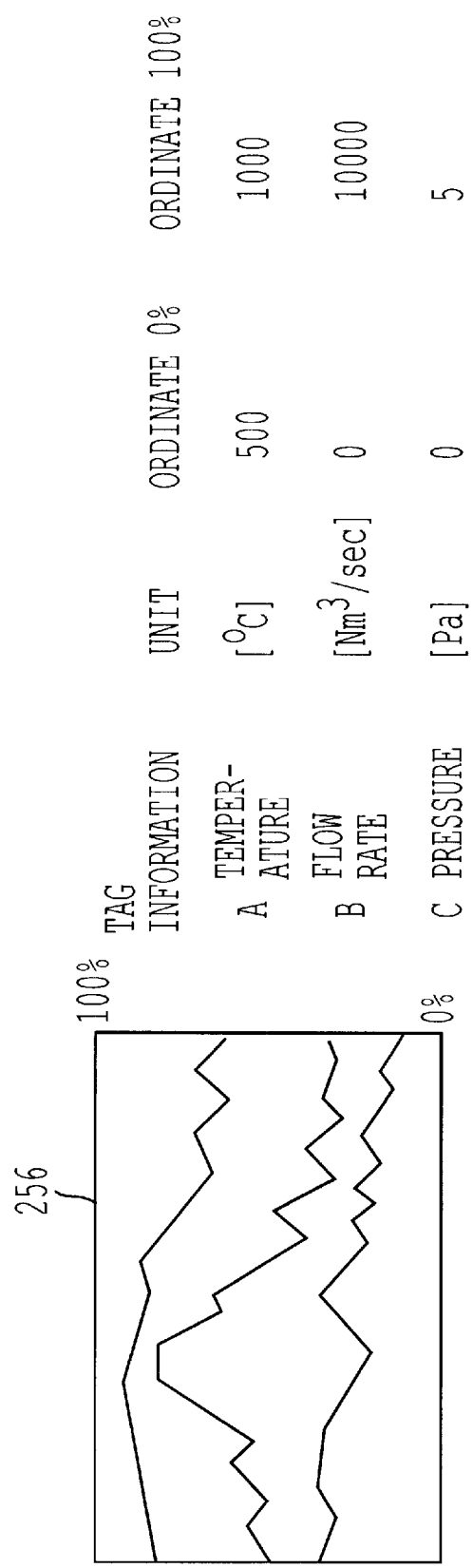
[FIG. 32] An explanatory drawing for showing an example of processing to display a plurality of trend data simultaneously on a single trend graph screen.

Data items of the time series data acquired by the plant include various physical amounts such as a temperature, a flow rate, and a pressure, wherein data of which types and ranges are largely different are mixed. When the trend of these time series data are displayed in a graph, it is necessary to prepare a means for changing range or the like. An example of processing to display which simultaneously displays a plurality of trend data on a screen of trend graph is illustrated in FIG. 32.

An ordinate of the trend graph 256 is set to have a lower limit of 0% and an upper limit of 100%, and values corresponding to the lower limit and the upper limit are set for each data item and displayed on a right side of the trend graph 256. The trend data are displayed in the trend graph 256 in correspondence with thus set range. It is possible to arbitrarily change the displaying range of the trend graph

256 by newly inputting the above value of lower limit and the value of upper limit. By this, it is possible to display data having largely different types and ranges on a single trend graph and easily compare these trends.

Figures 33A, 33B:
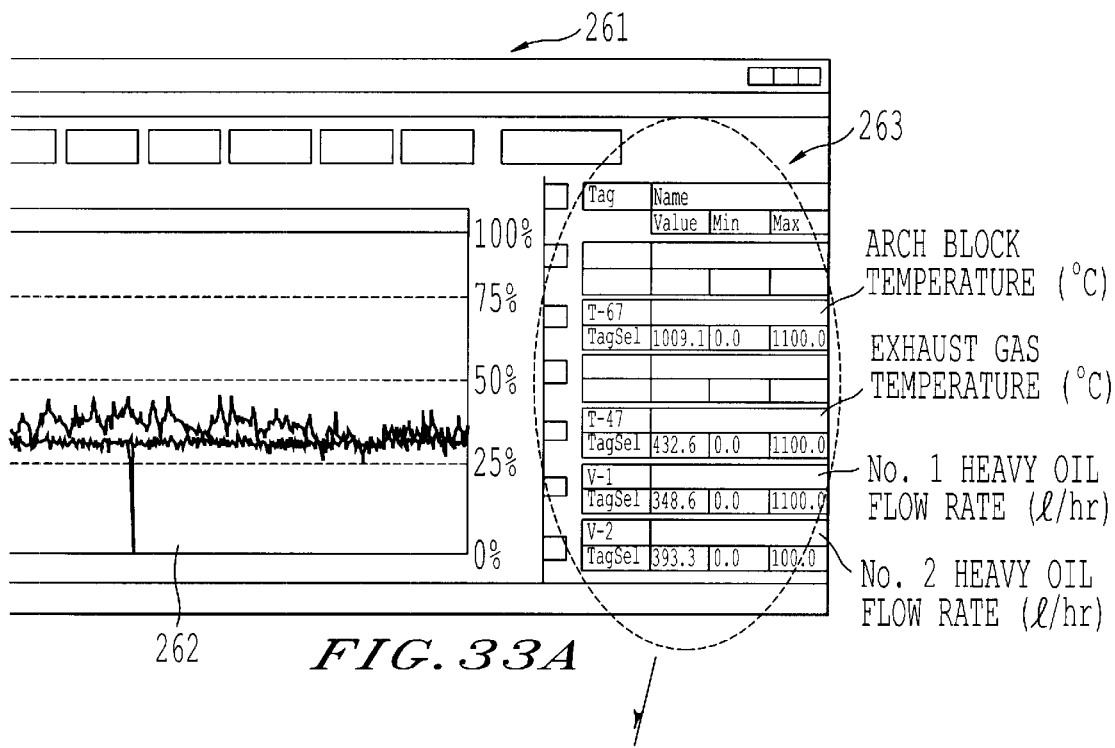
[FIGS. 33A and 33B] Explanatory drawings for showing an example of practically displaying range setting of trend graph.

FIGS. 33A and 33B show a specific example of displaying how to set the range in the trend graph. On a screen of trend graph 261, a region of displaying tag information 263 is provided on a right side of a trend graph 262. In FIG. 33B, the region of displaying the tag information 263 of FIG. 33A is illustrated by magnifying. In the region of displaying tag information 263, tag information 264 represented by a sign such as "T-67" is displayed in its left end, and on a right side thereof, a name of data item 265 corresponding to the tag information 264 is displayed. In a lower portion of numerical reference 265, from a left side a data value 266 of a portion designated by a cursor or the like in the trend graph 262, a minimum value of the ordinate 267 corresponding to a range of 0%, and the maximum value of the ordinate 268 corresponding to a range of 100% are respectively displayed using numerals.

In the system for monitoring plant data according to this embodiment, the terminal for monitoring trend data 240 has a function of a means for displaying plural, and it is possible to independently and simultaneously display a plurality of screens of trend graph. FIG. 34 illustrates an example of processing to display trend data separately in a plurality of trend graphs for enabling to simultaneously compare these.

When a user selects desirable tag information out of the list of tag information 255 and operates to drag and drop on the screen of trend graph 254 by a plurality of times, a plurality of trend graphs 256a, 256b are displayed as independent graphs on the screen of trend graph 254. At this time, by independently executing a process of reading out trend data illustrated in FIGS. 28 and 29 by a plurality of times, it is possible to independently read out the plurality of trend data and making independently display the respective trend graphs 256a and 256b.

In virtue of this function of displaying plural, it is possible to compare and analyze trend graphs in different terms in a series of time series data such as a past trend and a present trend by substantially adjacently arranging these trend graphs, compare and analyze graphs of trend data in different plants by simultaneously arranging and displaying, and compare and analyze certain data in different time scales such as a unit scale of year and a unit scale of second by simultaneously arranging and displaying in different time scales. Also in this case, it is possible to change the time scale, a time period to be displayed, and a displaying range of the trend graph and control to scroll the trend graph.

FIGS. 35 and 36 show a specific example of displaying in independently displaying a plurality of trend graphs. FIG. 35 illustrates an example that a screen of trend graph 261a corresponding to trend data of the plant A and a screen of trend graph 261b corresponding to trend data of the plant B are simultaneously and independently displayed. FIG. 36 shows an example that a screen of trend graph 261c displaying certain trend data in a long term scale and a screen of trend graph 261d displaying the same in a short term scale are simultaneously and independently displayed. In this case, a portion encircled by a broken line in the screen of trend graph 261c in the long term scale is displayed by magnifying as the screen of trend graph 261d in the short term scale.

Next, a function of cutting out numerical data used for numerically processing and analyzing trend data will be described in reference of FIGS. 37A–37C. In the system for monitoring plant data according to this embodiment, it is possible to execute a process of taking out trend data out of a displayed trend graph as numerical data. At first, trend graph including a time required to take out is displayed by scrolling or setting a time scale as illustrated in FIG. 37A. In order to designate the time required to take out as the numerical data with respect to this trend graph, an initial date and a final date for taking in are inputted or selected by a pointer of a mouse or the like as illustrated in FIG. 37B. In case that the amount of data is large, because of a long time period to be taken out, the data are set to be thinned out or subjected to any treatment to achieve the same effect so that an appropriate amount of numerical data are taken out.

In response to the designation of the above time, corresponding trend data are read out and taken out as numerical data as illustrated in FIG. 37C. Such a mechanism of enabling to execute to take out the numerical data is provided in a software program for executing data processing on a side of the server, a side of the terminals, or both of these. The taken out numerical data can be viewed and confirmed by a user on the spot and stored in a recording medium as a file, whereby it is also possible to variously process by reading using an ordinary spread sheet software and so on.

Conventionalily, it takes a long labor hour for acquiring trend data as numerical data. However, in the system for monitoring plant data according to this embodiment, because it is possible to instantaneously take out trend data in a desirable time as numerical data in virtue of the above-mentioned function of cutting out numerical data, it is possible to quite efficiently process to numerically analyze trend data.

Incidentally, a function of storing information for setting display in a screen of trend graph will be described in reference of FIGS. 38A, 38B, 39A, and 39B. In the system for monitoring plant data according to this embodiment, information for setting display such as the selected tag information, the setting of range of the ordinate, and setting the time scale of an abscissa concerning the displayed trend graph can be stored and reused.

As illustrated in FIGS. 32, 33A, and 33B, trend data concerning a single or a plurality of tag information (data item) are read out and the range (minimum value and maximum value) of the ordinate is set for the respective trend data, whereby the trends of the respective data items can be displayed in a graph in a desirable and appropriate mode. Generally, items of data daily seeked are the same in most cases. Because it takes a long time to newly select each of tag information and reset a range of the ordinate, a mechanism of executing to store information for setting display in a screen of trend graph and read out is provided in a software program for executing data processing on the side of the server, the side of the terminal, or both of these.

Figures 38A, 38B:
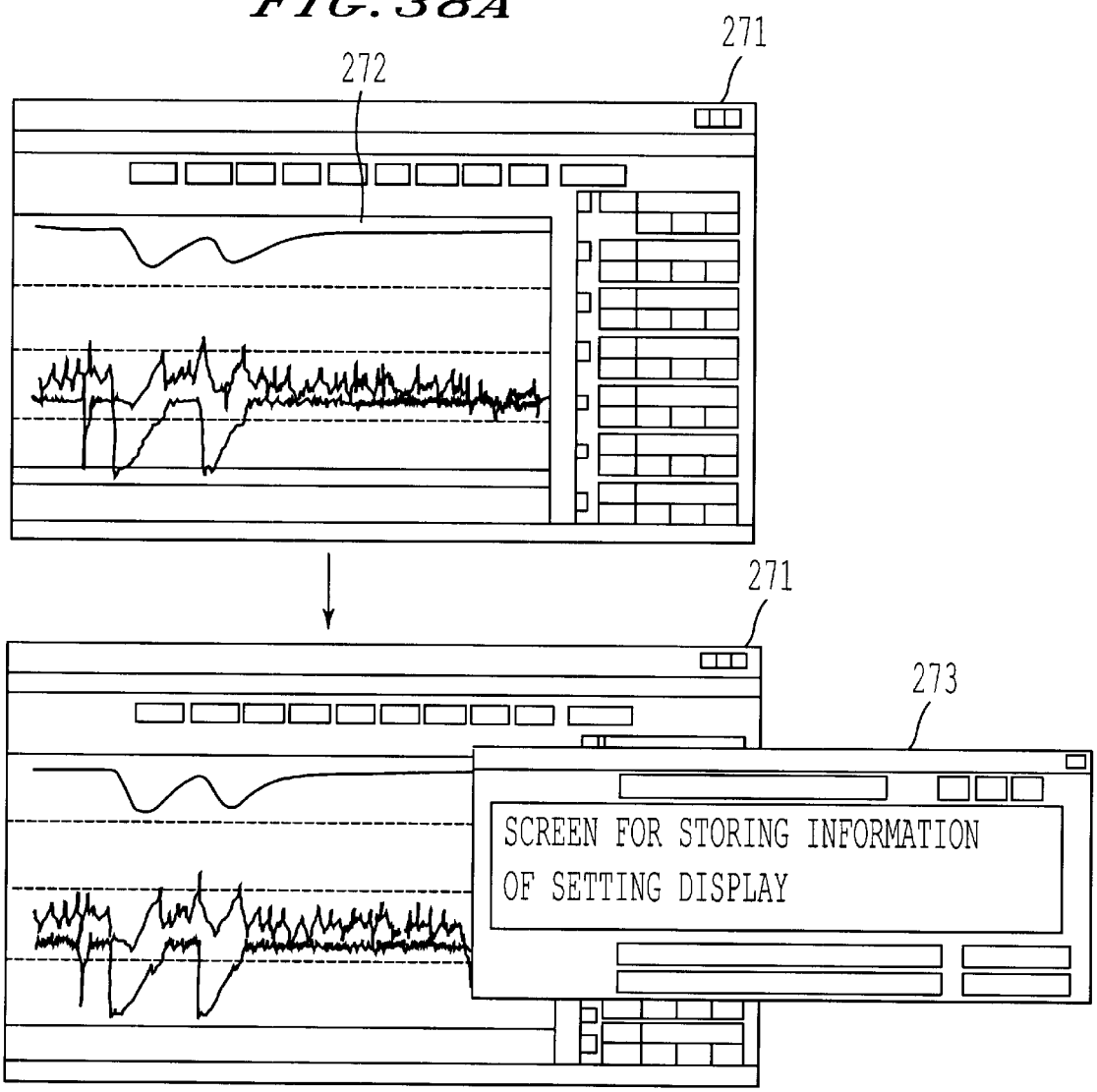
[FIGS. 38A and 38B] Explanatory drawings for showing an example of displaying on a screen at time of storing information for setting display of a trend graph screen.

When the information of setting display is stored, at first requisite tag information is selected and a range of the ordinate is set to display a trend graph 272 under appropriately set state of trend graph on a screen 271 as illustrated in FIG. 38A. Then, as illustrated in FIG. 38B, a screen of storing information of setting display 273 is displayed upon an instruction of user, and the information of setting display is stored in a recording medium in the terminal for monitoring trend data 240. By making it possible to store the information of setting display by an arbitrary designation of a file name by a user as a file, it is possible to store groups of the information of setting display as much as wanted.

When the information of setting display is read out, as illustrated in FIG. 39A, a screen for selecting information of setting display 274 is displayed upon an instruction of user, and the stored information of setting display is read out by selecting a file name. By this, the tag information, the range of the ordinate, the time scale of the abscissa, and so on are automatically set, whereby the previous state of trend display (FIG. 38B) is reproduced, and the appropriately set trend graph 272 is displayed on the screen of trend graph 271 as illustrated in FIG. 39B.

By such a function of storing the information of setting display, it is possible to read out the displayed state of trend graph daily sought by a simple operation and easily realize a desirably set trend display at a high speed.

As described, in the system of displaying time series data according to this embodiment, it is possible to search and read out desirable data out of a great amount of time series data of a plurality of plant, instantaneously call trend data of different plants and simultaneously display to analyze, display trend of a past and the present of arbitrary data, and display in various time scales from a unit of second to a unit of year, whereby a user can analyze by efficiently and instantaneously displaying in various modes required by the user. Especially, in use of a method for hierarchically storing time series data described in First or Second Embodiment, it is possible to demonstrate a further high speed and further efficiency in processing to read out data.

For example, conventionally, it was very troublesome and impossible in a short time to compare time series data of analogous plants in remote locations and technically analyze. On the other hand, in these embodiments, trend data can be read out on a screen of monitor of a terminal through a network and simultaneously display even though the trend data are for a remote location, whereby it is possible to very efficiently and easily compare to analyze the trend data. Further, it is also possible to conduct a substantially real-time analyzation at a single location by a specialized technician for trend data of a plurality of plants including those located in remote locations.

Further, by dispersely storing time series data for each group of plants and so on and making a data base to have a structure independent by groups, it is possible to newly add a group, change tag information and so on of the groups, and remove a group, whereby it is possible to flexibly and easily deal with a change of system. In this case, because it is sufficient to change only address information of a network server and so on, on a side of terminal for monitoring trend data, it is possible to reduce a cost for introducing a system. Further, it is possible to simply constitute a device such as a network server and a terminal for monitoring trend data and make a cost per a unit of the device low. Further, even in case that a certain network server in a group is troubled, it is possible to normally read out data of time series data in other groups, whereby a total system is prevented from downing and a restoration of a troubled portion is easy.

INDUSTRIAL APPLICABILITY

As described, according to the method for storing time series data, the time series data base system, the system for displaying time series data, and the recording medium recording time series data of the present invention, there is an effect that a process of reading out requisite data can be efficiently executed at a high speed in case of storing a great amount of data.

Further, in accordance with the process of processing time series data, the system for processing time series data, and the recording medium recording time series data and a program for processing time series data of the present invention, there is an effect that a process relating to, for example, storage, reading out, and transfer of data is efficiently executable at a high speed without increasing the amount of data to be treated at time of processing a great amount of data.

According to the time series data base system and the method for processing time series data of the present invention, requisite time series data can be efficiently and freely read out of a great amount of time series data belonging to a plurality of groups.

Further, according to the system for displaying time series data and the method for processing time series data of the present invention, there is an effect that trends of a plurality of time series data can be easily displayed at a high speed in a mode required by a user.

What is claimed is:

1. A time series data base system, comprising:

means for controlling to store data which stores time series data at an arbitrary sampling period $\Delta T0$ concerning an arbitrary object, stores time series data at a sampling period $\Delta Ti$ (i is an integer of 1 or more) longer than the sampling period $\Delta T0$ concerning the object, repeatedly conducts an operation of storing the time series data at the sampling period $\Delta Ti$ by at least one time or more, and stores the time series data at a plurality of sampling periods in a recording medium in a state that the time series data are hierarchically correlated;

means for controlling to read out data which appropriately selects and reads time series data stored in said recording medium out of the time series data at the plurality of sampling periods upon a request of reading out the time series data; and means for displaying time series data which displays the read out time series data in a graph, wherein
said means for controlling to read out data initially selects and reads out coarse data at a long sampling period which are coarsely displayed in said means for displaying and succeedingly selects and reads out dense data at a short sampling period which are densely displayed in comparison with the coarse data in said means for displaying, upon said request of reading out.

2. A time series data base system, comprising:

means for controlling to store data which stores time series data at an arbitrary sampling period $\Delta T0$ concerning an arbitrary object, stores time series data at a sampling period $\Delta Ti$ (i is an integer of 1 or more) longer than the sampling period $\Delta T0$ concerning the object, repeatedly conducts an operation of storing the time series data at the sampling period $\Delta Ti$ by at least one time or more, and stores the time series data at a plurality of sampling periods in a recording medium in a state that the time series data are hierarchically correlated;

means for controlling to read out data which appropriately selects and reads time series data stored in said recording medium out of the time series data at the plurality of sampling periods upon a request of reading out the time series data; and means for displaying time series data which displays the read out time series data in a graph, wherein
said means for controlling to read out data initially selects and reads out coarse data at a long sampling period which are coarsely displayed in said means for displaying, succeedingly selects and reads out first dense data at a short sampling period which are densely displayed in comparison with the coarse data in said means for displaying, and gradually thereafter selects and reads out jth (j is an integer of 2 or more) dense data at a short sampling period shorter than that of the first dense data upon said request of reading out.

3. A method for processing time series data comprising:

a step of sampling basic data which samples data at a phase of 0 and a sampling period of $n \times \Delta T0$ (n is a number obtained by raising 2 to powers) based on a standard of a predetermined time out of the time series data as basic data; and a step of sampling hierarchical data which samples data at a phase of $n/2^m \times \Delta T0$ and a sampling period of $n/2^{m-1} \times \Delta T0$ (m is an integer of 1 or more) based on the predetermined time out of the time series data as mth hierarchical data, wherein said step of sampling hierarchical data is repeated by at least one time, and the time series data at a plurality of the sampling periods are hierarchically arranged.

4. A method for processing time series data according to claim 3, wherein said step of sampling hierarchical data is repeated until $n/2^m = 1$ is established to form hierarchical time series data having a substantially same amount as that of the time series data before sampling.

5. A method for processing time series data comprising in processing time series data at an arbitrary sampling period of $\Delta T0$ concerning an arbitrary object:

a step of arranging data which samples basic data at a phase of 0 and a sampling period of $n \times \Delta T0$ (n is a number obtained by raising 2 to powers) based on a standard of a predetermined time and mth hierarchical data at a phase of $n/2^m \times \Delta T0$ and a sampling period of $n/2^{m-1} \times \Delta T0$ (m is an integer of 1 or more) based on a standard of the predetermined time out of time series data and forms hierarchical time series data by hierarchically arranging the time series data at a plurality of the sampling periods; and a step of accessing data which initially accesses said basic data and sequentially accesses from a 1st upper hierarchical data in the mth hierarchical data in case of accessing the time series data.

6. A recording medium readable by a computer which records a program for processing data including:

a step of sampling basic data which samples data at a phase of 0 and a sampling period of $n \times \Delta T0$ (n is a number obtained by raising 2 to powers) based on a standard of a predetermined time out of time series data as basic data; and a step of sampling hierarchical data which samples data at a phase of $n/2^m \times \Delta T0$ and a sampling period of $n/2^{m-1} \times \Delta T0$ (m is an integer of 1 or more) based on a standard of the predetermined time out of the time series data as mth hierarchical data, wherein said step of sampling hierarchical data is repeated by at least one time or more to hierarchically arrange the time series data at a plurality of the sampling periods.

7. A recording medium readable by a computer recording a program for processing data including in processing time series data at an arbitrary sampling period of $\Delta T0$ concerning an arbitrary object:

a step of arranging data which forms hierarchical time series data by sampling basic data at a phase of 0 and sampling period of $n \times \Delta T0$ (n is a number obtained by raising 2 to powers) based on a standard of a predetermined time out of the time series data and mth hierarchical data at a phase of $n/2^m \times \Delta t0$ and a sampling period of $n/2^{m-1} \times \Delta T0$ (m is an integer of 1 or more) based on a standard of the predetermined time out of the time series data, and hierarchically arranging the time series data at a plurality of the sampling periods; and a step of accessing data which initially accesses the basic data and sequentially accesses from a 1st upper hierarchical data in the mth hierarchical data in case of accessing the time series data.

8. A recording medium readable by a computer which records time series data at an arbitrary sampling period of $\Delta T0$ concerning an arbitrary object, wherein basic data at a phase of 0 and a sampling period of $n \times \Delta T0$ (n is a number obtained by raising 2 to powers) based on a standard of a predetermined time and mth data at a phase of $n/2^m \times \Delta T0$ and a sampling period of $n/2^{m-1} \times \Delta T0$ (m is an integer of 1 or more) based on a standard of the predetermined time are recorded by sampling these time series data at a plurality of the sampling periods out of the time series data and hierarchically arranging these.

9. A system for processing time series data which processes time series data at an arbitrary sampling period of $\Delta T0$ concerning an arbitrary object comprising:

a means for controlling to arrange data which samples data at a phase of 0 and a sampling period of $n \times \Delta T0$ (n is a number obtained by raising 2 to powers) based on a standard of a predetermined time out of the time series data as basic data, samples data at a phase of $n/2^m \times \Delta T0$ and a sampling period of $n/2^{m-1} \times \Delta T0$ (m is an integer of 1 or more) based on a standard of the predetermined time out of the time series data as mth hierarchical data, and hierarchically arranges the time series data at a plurality of the sampling periods; and a means for controlling to store data which stores the hierarchically arranged time series data in a recording medium.

10. A system for processing time series data which processes time series data at an arbitrary sampling period of $\Delta T0$ concerning an arbitrary object comprising:

a means of controlling to arrange data which samples data at a phase of 0 and a sampling period of $n \times \Delta T0$ (n is a number obtained by raising 2 to powers) based on a standard of a predetermined time out of the time series data as basic data, samples data at a phase of $n/2^m \times \Delta T0$ and a sampling period of $n/2^{m-1} \times \Delta T0$ (m is an integer of 1 or more) based on a standard of the predetermined time out of the time series data as mth hierarchical data, and hierarchically arranges the time series data at a plurality of the sampling periods; and a means for controlling to access data which initially accesses the basic data and sequentially accesses 1st upper hierarchical data in the mth hierarchical data in case of accessing the hierarchically arranged time series data.

11. A system of processing time series data which processes time series data at an arbitrary sampling period of $\Delta T0$ concerning an arbitrary object comprising:

which samples data at a sampling period of $n \times \Delta T0$ (n is a number obtained by raising 2 to powers) based on a standard of a predetermined time out of the time series data, samples data at a phase of $n/2^m \times \Delta T0$ and a sampling period of $n/2^{m-1} \times \Delta T0$ (m is an integer of 1 or more) based on a standard of the predetermined time out of the time series data, and hierarchically arranges the time series data at a plurality of the sampling periods; and a means for controlling to access data which accesses basic data forming time series data at a predetermined sampling period and hierarchical data corresponding to the basic data substantially at a same time in accessing the hierarchically arranged time series data.

12. The system for processing time series data according to claim 10, further comprising:

a display means which displays the hierarchically arranged time series data in a graph.

13. The system for processing time series data according to claim 10, further comprising:

a means for transferring data which transfers the hierarchically arranged time series data through a network.

14. The system for processing time series data according to claim 11, further comprising:

a display means which displays the hierarchically arranged time series data in a graph.

15. The system for processing time series data according to claim 11, further comprising:

a means for transferring data which transfers the hierarchically arranged time series data through a network.

* * * * *